US012625081B2

(12) United States Patent
Florescu

(10) Patent No.: US 12,625,081 B2
(45) Date of Patent: May 12, 2026

(54) SINGLE-USE CLINICAL SPECTROPHOTOMETER

(71) Applicant: In Diagnostics, Inc., Carlsbad, CA (US)

(72) Inventor: Octavian Florescu, Carlsbad, CA (US)

(73) Assignee: In Diagnostics, Inc., Carlsbad, CA (US)

( * ) Notice: Subject to any disclaimer, the term of this patent is extended or adjusted under 35 U.S.C. 154(b) by 1070 days.

(21) Appl. No.: 17/334,576

(22) Filed: May 28, 2021

(65) Prior Publication Data

US 2021/0285887 A1 Sep. 16, 2021

Related U.S. Application Data

(63) Continuation-in-part of application No. PCT/US2019/063877, filed on Nov. 29, 2019.

(60) Provisional application No. 62/858,865, filed on Jun. 7, 2019, provisional application No. 62/817,706, filed
(Continued)

(51) Int. Cl.
| | |
|---|---|
| *G01N 21/78* | (2006.01) |
| *B01L 3/00* | (2006.01) |
| *G01J 3/02* | (2006.01) |
| *G01J 3/42* | (2006.01) |
(Continued)

(52) U.S. Cl.
CPC ............ *G01N 21/78* (2013.01); *B01L 3/5085* (2013.01); *G01J 3/0218* (2013.01); *G01J 3/0272* (2013.01); *G01J 3/0283* (2013.01); *G01J 3/42* (2013.01); *G01N 21/255* (2013.01); *G01N 21/272* (2013.01); *B01L 2200/16*

(2013.01); *B01L 2300/0663* (2013.01); *B01L 2300/161* (2013.01); *B01L 2400/0406* (2013.01);
(Continued)

(58) Field of Classification Search
CPC .... G01N 21/78; G01N 21/255; G01N 21/272; G01N 2201/0627; G01N 2201/1222; G01N 21/31; G01N 21/01; B01L 3/5085; B01L 2200/16; B01L 2300/0663; B01L 2300/161; B01L 2400/0406; G01J 3/0218; G01J 3/0272; G01J 3/0283; G01J 3/42
See application file for complete search history.

(56) References Cited

U.S. PATENT DOCUMENTS

| | | | |
|---|---|---|---|
| 6,503,198 B1 | 1/2003 | Aronowitz et al. |
| 6,828,099 B2 | 12/2004 | Michnick et al. |
| 2006/0254962 A1 | 11/2006 | Samsoondar |
(Continued)

FOREIGN PATENT DOCUMENTS

| | | |
|---|---|---|
| CN | 108139332 | 6/2018 |
| CN | 105122017 | 8/2019 |
(Continued)

*Primary Examiner* — Elizabeth A Robinson
*Assistant Examiner* — Sophia Y Lyle
(74) *Attorney, Agent, or Firm* — Levine Bagade Han LLP

(57) ABSTRACT

The single-use disposable spectrophotometer described in this disclosure can measure one or more blood chemistry analytes from a drop of whole blood. A passive filtration system takes whole blood and delivers plasma along with a dissolved reporter molecule to one or more spectrophotometers which can operate with narrow band optical spectrum centered on an optical detection frequency. The spectrophotometer detects the changes in absorption of the plasma as a result of a chemistry reaction to determine the concentration or activity of one or more analytes.

18 Claims, 11 Drawing Sheets

Related U.S. Application Data on Mar. 13, 2019, provisional application No. 62/772,778, filed on Nov. 29, 2018.

(51) Int. Cl.
     *G01N 21/25*          (2006.01)
     *G01N 21/27*          (2006.01)

(52) U.S. Cl.
     CPC ............... *G01N 2201/0627* (2013.01); *G01N 2201/1222* (2013.01)

(56)                    References Cited

U.S. PATENT DOCUMENTS

2009/0181413 A1* 7/2009 Itoh ........................ G01N 21/78
                                                         435/26
2012/0202709 A1* 8/2012 Bergo ................. B01J 19/0046
                                                         506/23
2012/0252704 A1* 10/2012 Jaffe ..................... G01N 21/255
                                                         422/82.08
2012/0258466 A1* 10/2012 Florescu .......... G01N 33/54333
                                                         435/7.1
2013/0084565 A1* 4/2013 Landers ................. G01N 21/75
                                                         435/6.11
2013/0230913 A1* 9/2013 Florescu ................ G01N 21/17
                                                         422/69
2015/0301031 A1* 10/2015 Zin ........................ G01N 27/02
                                                         436/164
2017/0276599 A1 9/2017 Li et al.

FOREIGN PATENT DOCUMENTS

DE      102010030069 A1 * 12/2011 .......... G01N 21/645
WO      WO 2020/113183        6/2020

* cited by examiner

SINGLE-USE CLINICAL SPECTROPHOTOMETER

CROSS-REFERENCE TO RELATED APPLICATION

This application is a continuation-in-part of International Application No. PCT/US19/63877, filed Nov. 29, 2019, which claims priority to U.S. Provisional Application Nos. 62/772,778, filed Nov. 29, 2018; 62/817,706, filed Mar. 12, 2019; and 62/858,865, filed Jun. 7, 2019, all of which are incorporated by reference in their entireties.

TECHNICAL FIELD

The present disclosure relates to single-use, disposable, digital biosensors and integrated circuit-based biosensors with whole blood sample preparation

BACKGROUND

A chemistry test can be used to measure the concentration or activity of one or more analytes, i.e., endogenous compounds, circulating in blood. These analytes are often small molecules such as ions, blood gases and enzymes. Examples of analytes include albumin, blood urea nitrogen, uric acid, calcium, carbon dioxide (bicarbonate), chloride, creatinine, glucose, potassium, sodium, magnesium, phosphorus, lactate, amylase, lactate dehydrogenase, direct bilirubin, total cholesterol, high-density lipoprotein cholesterol, triglycerides, total bilirubin, total protein, creatine kinase, alanine aminotransferase (ALT), alkaline phosphatase (ALP), aspartate aminotransferase (AST) and gamma glutamyltransferase. These chemistry tests are also commonly referred to as blood chemistries, general chemistries, basic or complete metabolic panels, chemistry panels or specific organ panels. The results from a chemistry test can provide insight into the function of the kidneys, liver, heart, pancreas, bones and lungs among other biological systems.

The results from a chemistry test can be critically time sensitive, yet the instruments capable of performing such measurements are often relegated to emergency departments and central laboratories and require burdensome calibration and maintenance.

Spectrophotometry was developed by Arnold Beckman in 1940. While the testing modality for a variety of blood tests has evolved, spectrophotometry continues to be the bedrock of modem laboratory testing. This disclosure miniaturizes and integrates a spectrophotometer into a single-used disposable device. Users can place a samples of blood from a finger-stick or venipuncture on the inlet of device. The sample is wicked into a membrane filtration sample preparation system, which passively provides plasma to a disposable spectrophotometer for quantification of one or more analytes in the sample.

Spectrophotometer 15 can differ from conventional spectrophotometers in a variety of ways: 1) the detection in this disclosure can be performed on undiluted samples, 2) the path length can be much shorter than in conventional spectrophotometers, 3) the illumination can be from an LED 5 emitting light with a narrow band optical spectrum, 4) the reflector 6 can be made from injection molded plastic, 5) the reagents can be stored in a dry state in device and 6) there can be at least one photodiode per well, 7) Spectrophotometer in this disclosure can be integrated into a single-use disposable.

SUMMARY

Device is a single-use clinical spectrophotometer for measuring the concentration or activity of one or more analytes 36 in plasma 17. Device can comprise:

A battery 40 that can be electrically connected to a spectrophotometer 15, wherein battery 40 can supply power to spectrophotometer 15;

A digital display 41 that can be electrically connected to spectrophotometer 15, wherein digital display 40 can display the concentration of one or more analytes in plasma 17; A filter 2 that can be mounted on surface 11, wherein filter 2 can be a plasma separation membrane, and wherein filter 2 can be impregnated with a reporter molecule.

A surface 11 that can fluidically connect filter 2 with spectrophotometer 15, wherein plasma 17 from filter 2 can flow directly from surface 11 into spectrophotometer 15;

A chemical reaction 35 that can be a homogenous reaction limited by the concentration or activity of analyte 36 in plasma 17 in well 19, and wherein reporter molecule can be a product or reactant to chemical reaction 35, A spectrophotometer 15 that can contain plasma 17 with dissolved reporter molecule in suspension, wherein spectrophotometer 15 can measure the rate of change or absolute change of the concentration of the reporter molecule in plasma 17 in well 19, and calculate a corresponding concentration or activity of analyte 36 in plasma 17 in well 19.

DETAILED DESCRIPTION

Figure 1A:
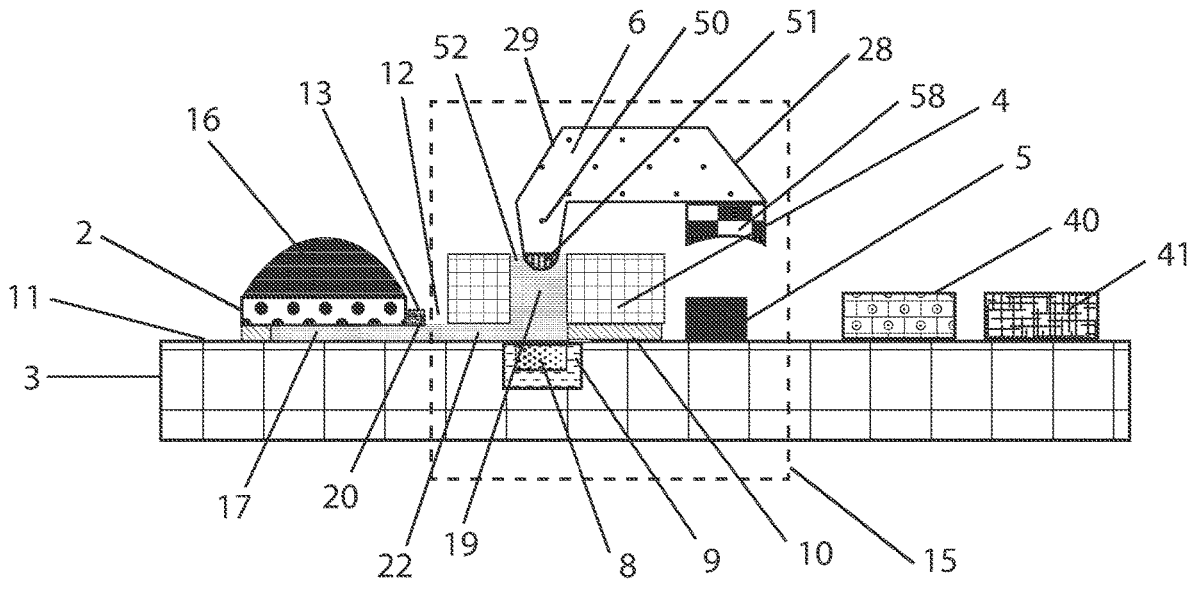
FIG. 1A presents a cross sectional side view of device that can have a filter 2, a surface 11 and a spectrophotometer 15.

Spectrophotometer 15 can be an absorption spectrophotometer, wherein light traverses through plasma 17 and wherein reporter molecule can absorb part or all of light traversing through plasma 17. Spectrophotometer 15 can be a reflectance spectrophotometer, wherein light reflects off plasma 17 and wherein reporter molecule can absorb part or all of light reflecting off plasma 17. Spectrophotometer 15 can be a single frequency spectrophotometer. Spectrophotometer 15 can operate using a narrow band optical spectrum, centered at optical detection frequency. Spectrophotometer 15 can be configured to measure concentration or activity of analyte 36 in plasma 17. Spectrophotometer 15 can be configured to measure the absolute or rate of change of the absorption of plasma 17 in well 19 at the optical detection frequency. Spectrophotometer 15 can be configured to measure the rate of or absolute change in the absorption of reporter molecule in plasma 17 in well 19 at the optical frequency. Spectrophotometer 15 can comprise a surface capillary 22 that can fluidically connect filter 2 or surface 11 with well 19. Spectrophotometer 15 can comprise a light emitting diode (LED) 5 capable of emitting light with a peak frequency at the optical detection frequency. LED 5 can be capable of emitting light with a narrow band optical spectrum. Spectrophotometer 15 can comprise a reflector 6 capable of redirecting light at the optical detection frequency through plasma 17 in well 19 and onto photodetector 8. Reflector 6 can capable of redirecting light at the optical detection frequency through plasma 17 normal to the detection plane of photodetector 8. Spectrophotometer 15 can comprise a photodetector 8 that can be sensitive to light at the optical detection frequency. Photodetector 8 can be capable of measuring the change over time of the transmittance of plasma 17 in well 19 at the optical detection frequency, resulting from the change over time of the concentration of reporter molecule in plasma 17 in well 19, corresponding to the concentration or activity of analyte 36 in plasma 17 in well 19. Photodetector 8 can be capable of measuring the change over time of the transmittance of plasma 17 in well 19 at the optical detection frequency, resulting from the change over time of interferences. Photodetector 8 can be capable of measuring the change over time in the transmittance of reporter molecule in plasma 17 in well 19 at the optical detection frequency.

Device can analyze a variety of sample types such as whole blood, plasma, serum, plasma products, calibrators, purified solutions, tears, saliva and urine. Device and spectrophotometer 15 can analyze aqueous samples in well 19. Device can used the measure the plasma concentration of albumin, blood urea nitrogen, uric acid, calcium, carbon dioxide (bicarbonate), chloride, creatinine, glucose, potassium, sodium, magnesium, phosphorus, lactate, amylase, lactate dehydrogenase, direct bilirubin, total cholesterol, high-density lipoprotein cholesterol, triglycerides, total bilirubin, total protein, creatine kinase, alanine aminotransferase (ALT), alkaline phosphatase (ALP), aspartate aminotransferase (AST) and gamma glutamyltransferase, and other analytes. An analyte can also be referred to as an endogenous compound.

Multiplexing

The optical detection frequency 60 can be 340 nm, 405 nm, 467 nm, 550 nm, 600 nm, 850 nm or other frequencies. Spectrophotometer 15 can comprise a plurality of wells, through which light can travel to a plurality of photodetectors. Spectrophotometer 15 can contain a single reflector 6 and a single LED 5, wherein reflector 6 has the necessary optical elements to split light from a single LED 5 and redirect the split light through a plurality of wells onto a plurality of photodetectors. Each well can be above, below, adjacent, abutted or in proximity to a dedicated photodetector. Spectrophotometer 15 can have a plurality of wells, wherein each well can be each adjacent to a single photodetector. A spectrophotometer can comprise a single filter 2 and a plurality of wells, such that plasma 17 from whole blood 16 can flow passively from filter 2, across one or more surfaces into a plurality of wells. A plurality of spectrophotometers can share a single filter, such that plasma 17 from whole blood 16 can flow passively from filter 2 into a plurality of wells in a plurality of spectrophotometers. Device can comprise one or more surfaces that can fluidically connect one or more filters to one or more wells in one or more spectrophotometers. Device can comprise a plurality of spectrophotometers, wherein the plurality of spectrophotometers can operate at different frequencies of detection. A plurality of spectrophotometers can share a single IC 9 or AOW 4.

Reaction

Chemical reaction 35 can be composed of multiple reactions. Chemical reaction 35 can be homogeneous and label-free. Chemical reaction 35 can be limited by the concentration or activity of analyte 36 in plasma 17 in well 19. For chemical reaction 35 to be limited by the concentration or activity of analyte 36, the concentration or activity of analytes 36 can be rate limiting reagents in chemical reaction 35 or the concentration or activity of analytes 36 can be the endpoint limiting reagents in chemical reaction 35. Reporter molecule can be a product or reactant to chemical reaction 35. Reporter molecule can be in excess in chemical reaction 35 wherein reporter molecule may not be the rate limiting reagent. Dissolved reagents 33 can be in excess in plasma 17 such that chemical reaction 35 can limited by the concentration or activity of analyte 36. Reporter molecule or reporter reagent can be a molecule that can absorb light with a linear extinction coefficient, whereby changes in the concentration of reporter molecule can be calculated using Beer-Lambert's law. Reporter molecule can absorb light at the optical detection frequency 60. Reporter molecule can have an absorption peak at the optical detection frequency 60.

Chemical reactions 35 can be a zero-order, pseudo-zero order, a first order or a higher order chemical reaction. In a rate measurement, the rate of reporter molecule consumed or produced can be measured. This rate can be proportional to concentration or activity of one or more analytes in plasma 17. In an endpoint measurement, the total amount of reporter molecule consumed or produced can be measured. This amount can be proportional to a physiological concentration or activity of one or more analytes.

Chemical reaction 35 can alter the absorption of plasma 17 in well 19 at the optical detection frequency 60. Chemical reaction 35 can alter the concentration of reporter molecule in plasma 17 in well 19. The change in concentration of reporter molecule in plasma 17 in well 19 can change the absorption of plasma 17 in well 19 at the optical frequency of detection 60. By measuring light absorption of plasma 17 in well 19 from the LED 5 at two different time points, and accounting for the time elapsed, a rate or endpoint measurement of reactions 35 can be calculated.

Surface 11 can be coated with surface reagents 30. Surface 11 adjacent to gap 12 can be coated with a hydrophilic reagent 31, such as surface reagents 30. Filter 2 can be coated or impregnated with filter reagents 32. Well 19 can be coated on the inside with well reagents 34. The bottom surface of AOW 4 can be coated with surface reagents 30 or well reagents 34. Additional reagents 37 can be dried in the form of a dried sphere 38. The dried sphere 38 can be placed at the top of well 19, at the bottom of well 19, inside well 19, below the filter 2, above the filter 2, next to filter 2, or in gap 12. The dried sphere 38 can be manufactured through lyophilization. The diameter of the dried sphere 38 can be less than 2 mm, 1.5 mm, 1 mm, 0.75 mm, 0.5 mm, 0.4 mm, 0.3 mm, 0.2 mm, or 0.1 mm. The dried sphere 38 can dissolve when contacted with fluid, such as the plasma 17. All the reagents can be stored dry in device until re-hydrated by plasma 17.

A drop of whole blood 16 from a fingerstick or venous whole blood draw can be applied on filter 2. The whole blood 16 can mix with filter reagents 32. Filter 2 can trap the blood cells in whole blood 16 and let pass through plasma 17. Plasma 17 can mix with filter reagents 32. Plasma 17 can flow from filter 2 onto surface 11. Plasma 17 can wick or sheet on surface 11, across gap 12, within slot 25. Hydrophilic reagent 31 can promote plasma 17 sheeting or wicking across gap 12 into surface capillary 22. Surface capillary 22 can be formed between the AOW 4 and surface 11, or between the IC 9 and surface 11. Plasma 17 can mix with surface reagent 30. Surface capillary 22 can connect to well 19 such that Plasma 17 can flow from surface capillary 22 and into well 19. Plasma 17 can flow up or down well 19 due to capillary action and can cease to flow once it reaches the opposite side of well 19. Plasma can contact lens 51 or protrusion 50 and excess plasma can vent through vent 52. A vent 52 can be an air channel that lets air pass through.

Reporter molecule can be included in surface reagents 30, hydrophilic reagents 31, filter reagents 32, well reagents 34, or additional reagents 37. Plasma 17 can mix with or dissolve dried reporter molecule surface reagents 30, hydrophilic reagents 31, filter reagents 32, prefilter reagents, well reagents 34 and additional reagents 37. Reporter molecule, surface reagents 30, hydrophilic reagents 31, filter reagents 32, well reagents 34, or additional reagents 37 can combine or dissolve into dissolved reagents 33 in plasma 17. Reporter molecule, surface reagents 30, hydrophilic reagents 31, filter reagents 32, well reagents 34, or additional reagents 37 can dissolve upon contact with plasma 17.

The dissolved reagents 33 in plasma 17 can participate in or initiate reactions 35 chemical reaction 35 in plasma 17 in well 19 that can alter the plasma absorption of plasma 17 in well 19 at an optical detection frequency 60.

Device can be configured to perform two multiplexed chemistry tests. A chemistry test that can have medical relevance is alanine aminotransferase (ALT) and aspartate aminotransferase (AST). The design in FIG. 1 can be configured so that ALT and AST measurements are performed separately and concurrently in well 19 and well 7, respectively. ALT can be performed using Filter 2, on surface 11 inside channel 25 and in well 19. AST can be performed using filter 55, on surface 11 inside channel 23 and in well 7. The chemical reactions for measuring ALT and AST are two examples of chemical reaction 35.

The chemical reaction for measuring ALT can comprise 1) ALT in plasma catalyzing the transfer of an amino group from L-alanine to alpha-ketoglutarate to form L-glutamate and pyruvate, and 2) lactate dehydrogenase (LDH) catalyzing the conversion of pyruvate to lactate and the oxidation of Nicotinamide adenine dinucleotide (NADH) to NAD+. The chemical reaction for measuring AST can comprise 1) AST catalyzing the conversion of L-aspartate and alpha-ketoglutarate into oxaloacetate and L-glutamate, and 2) Malate dehydrogenase (MDH) catalyzing the conversion of oxaloacetate into malate and the oxidation of NADH to NAD+. The reagent substrates for measuring AST and ALT can be introduced in abundance so the rate of the chemical reactions can be limited by the rate of endogenous AST and ALT in the plasma 17, respectively. The reporter molecule for both ALT and AST reactions can be NADH. NADH has a narrow band absorptions spectrum centered on 340 nm, so the amount or rate of NADH consumed in the chemical reactions can be measured by illuminating the wells 19 and 7 with light from an LED 5 emitting light with a narrow band optical spectrum with an optical detection frequency of 340 nm. Reflector 6 can redirect light from LED 5 into both wells 7 and 19. In a rate measurement, the rate of change of the absorption at 340 nm can be due to the conversion of NADH to NAD+ and can be proportional to the amount of ALT or AST present in the plasma 17. Photodetector 8 can measure the change in the amount of light transmitted through the plasma 17 in well 19 over time, and can determine from calibration values stored on the IC 9 the corresponding concentration of endogenous ALT and AST.

Filter reagents for filter 2 for ALT can comprise dried l-alanine, NADH, alpha-ketoglutarate, LDH and excipients. The surface reagents for ALT can comprise l-alanine, NADH, alpha-ketoglutarate, LDH and excipients. The well reagents for ALT can comprise hydrophilic reagents to maximize the capillary force, l-alanine, NADH, alpha-ketoglutarate, LDH and excipients. The additional reagents for ALT can comprise l-alanine, NADH, alpha-ketoglutarate, LDH and excipients.

Filter reagents for filter 55 for AST can comprise dried l-aspartate, NADH, alpha-ketoglutarate, MDH and excipients. The surface reagents for AST can comprise l-aspartate, NADH, alpha-ketoglutarate, MDH and excipients. The well reagents for AST can comprise hydrophilic reagents to maximize the capillary force, l-aspartate, NADH, alpha-ketoglutarate, MDH and excipients. The additional reagents for AST can comprise l-aspartate, NADH, alpha-ketoglutarate, MDH and excipients.

The ALT chemical reaction can be confined to well 19 by applying the ALT reagents exclusively to filter 2, on surface 11 inside channel 25 or in well 19. The AST chemical reaction can be confined to well 7 by applying the AST reagents exclusively to filter 55, on surface 11 inside channel 23 or in well 7.

Whole blood 16 can be applied to both filter 2 and filter 55 simultaneously. The chemical reactions in wells 19 and 7 can be measured concurrently or at different times.

ALT and AST are both examples of chemical reaction 35 where a rate measurement can be proportional to the activity of ALT and AST in whole blood 16. Chemical reaction 35 can be a rate reaction wherein the measurement can be performed in a single well 19.

Chemical reaction 35 can be an endpoint reaction, wherein the measurement can be performed in two wells, namely well 19 and well 7. Well 19 can be used to measure the concentration of reporter molecule produced or consumed, while well 7 can be used to measure the concentration of reporter molecule prior to any consumption or production. The dissolved reagents in well 7 can omit a key reagent necessary for chemical reaction 35, wherein the reporter molecule in well 7 can be neither consumed nor produced.

The dominant source of noise in an ALT assay can be the natural oxidation of NADH into NAD+ by endogenous reactions other than chemical reaction 35. Well 7 can be used as a blank well to measure the natural oxidation of NADH, or other blank measurement. The blank measurement can be subtracted from the chemical reaction 35 in well 19, or from other chemistry reaction measurements, to eliminate the contribution of the natural oxidation of NADH or other sources of noise. L-alanine can be omitted from the dissolved reagents, such that chemical reaction 35 cannot run in well 7 and only the blank measurement can be made in well 7. In the case of ALT, NADH can be dried in Filter 2 that can be shared between the measurement wells 7 and 19.

Blank wells can be used to measure interfering substances that can change the absorption of the plasma during run time of the assay.

Device can contain a blank filter 55 which can produce plasma 17 without reporter molecule. Device can contain a blank well 7 which can accumulate plasma 17 produced by blank filter 55, to measure the absorption of plasma 17 without reporter molecule, or blank measurement. The blank measurement can be used to determine the concentration of reporter molecule dissolved in plasma 17, or the intrinsic absorption of plasma 17 or both. The blank measurement can be subtracted from the absorption measurements in other wells. The blank measurement or NADH-blank measurement can be combined to measure endpoint reactions by providing the concentration of the reporter reagent before and after reaction 35 occurs.

The optical detection frequency 60 of the emission of the LEDs 5 can be selected to correspond to the spectral absorptivity of analyte 36 that yields the highest signal to noise ratio.

A plurality of wells can contain plasma with a plurality of dissolved reagents, wherein the dissolved reagents in one well can be different from the next well. A plurality of wells can be illuminated with light with a plurality of optical detection frequencies, wherein the optical detection frequencies in one well is different from the optical detection frequency of the next. A plurality of wells can receive plasma from a shared filter. Some wells can be used as blanks, wherein chemical reaction 35 may not proceed. The results from blank wells can be combined with the results from analyte measurement wells, wherein the concentration or activity of an analyte is measured.

Analyte Measurement

Spectrophotometer 15 can comprise an integrated circuit (IC) 9 that can integrate or embed one or more photodetectors, namely photodetector 8. IC 9 can integrate a calculation circuit that can calculate an absorption measurement from a transmittance measurement. The calculation circuit can calculate the rate of or absolute change of the absorption of reporter molecule in plasma 17 in well 19 from the rate of or absolute change in the transmittance of reporter molecule in plasma 17 in well 19. The calculation circuit can calculate the rate of or absolute change of the absorption of plasma 17 in well 19 from the rate of or absolute change in the transmittance of plasma 17 in well 19. The calculation circuits can calculate the ratio of serial measurements of transmittance. The calculation circuits can perform the logarithmic function in a base, such as 2, e, 8, 10, 16 or any other. The calculation circuits can perform the inverse logarithmic function, i.e. the exponential function in a base such as 2, e, 8, 10, 16 or any other. The calculation circuits can calculate the concentration or activity of analyte 36 in plasma 17 in well 19 using Beer-Lambert's law and serial measurements of the absorption or serial measurements of transmittances of plasma 17, the nominal path length in well 19, the elapsed time between serial measurements and the extinction coefficient of reporter molecule. The calculation circuits can calculate the concentration of analyte 36 in plasma 17 in well 19 from serial transmittance or absorption measurements from a control well. Calculation circuits can be arithmetic a logic unit (ALU), a digital signal processor (DSP) or a look-up table, or a combination thereof. Stored information stored or encoded in device can be stored or encoded in volatile or non-volatile memory integrated in IC 9 or in a separate memory chip IC electrically connected to IC 9. Stored information can store or encode the nominal path length of well 19 and the extinction coefficient of reporter molecule.

Path Length Control

Path length can be the distance traveled by light from LED 5 through plasma 17 in well 19. Different rays of light can travel a plurality of paths through plasma 17 in well 19. Path length can be the mean of the distribution of the distances the different rays of light traveled through plasma 17 in well 19. Path length can be less than 5 mm, 4 mm, 3 mm, 2 mm, 1.5 mm, 1.25 mm, 1 mm, 0.75 mm, 0.6 mm, 0.5 mm, 0.4 mm, 0.3 mm, 0.25 mm. The coefficient of variance of the distribution of the distances the different rays of light traveled through plasma 17 in well 19, can be less than 50%, 25%, 15%, 10%, 9%, 8%, 7%, 6%, 5%, 4%, 3%, 2% or 1%. For a device with a plurality of wells, the path lengths for each well can differ.

A nominal path length is a length that can be calculated from design specifications and measurements to estimate the actual path length. The path length in device is generally much shorter than traditional quantitative spectrophotometers. So small manufacturing tolerances can greatly affect path length. The nominal path length of well 19 can be different from the actual path length as a result of manufacturing tolerances. This difference between the actual path length and the nominal path length can impact the performance of spectrophotometer 15. The nominal path lengths for each well or aspects of the nominal path length for each well can be measured individually or in combination during manufacturing and can be stored in the stored information. Aspects of the nominal path length that can be measured individually or in combination during manufacturing can include the depth of well 9, the thickness of tape 10, the profile of reflector 6, the profile of protrusion 50, the profile of lens 51, the co-planarity of IC 9 and surface 11, the position of LED 5 on PCB, the relative position of LED 5 with respect to reflector 6, the relative position of LED 5 with respect to well 19, and the relative position of reflector 6 with respect to well 19 or incident angle of light on the detection plane of photodetector 8. Multiple aspects of the nominal path length can be combined mathematically or measured at once. The nominal path length can be a combination of one or more aspects of the nominal path length. The nominal path length can vary from the actual path length by a path length error less than 20%, 15%, 10%, 9%, 8%, 7%, 6%, 5%, 4%, 3%, 2% or 1%.

Light scattering off the walls of well 19 can widen the distribution of the distances traveled by the rays of light and therefore affect the path length error. The construction of well and photodetector 8 can be configured to avoid or reduce detection of light scattering off the walls of well 19. Photodetector 8 can be inset to the aperture of well 19 in proximity to photodiode 8 to reduce or eliminate the detection of light scattering off the walls of well 19. The construction of well 19 and photodetector 8 can be configured to avoid or reduce light scattering off the walls of well 19. The sidewalls of well 19 can have a draft angle of 1°, 2.5°, 5°, 10°, 12.5°, or 15°, wherein well 19 widens in the direction of photodetector 8. The draft angle can reduce or eliminate the scattering off the walls of well 19 of rays of light that radiate out from reflector 6 and are not normal, i.e. not perpendicular, to the plane of photodetector 8.

Light from LED 5 can be redirected by reflector 6 such that light is incident normal or oblique to the plane of photodetector 8. For superior path length control, light can be incident normal to the plane of photodetector 8 so that stray rays at oblique angles can accrue minimal additional path length error by the combination of symmetry and trigonometry of small angles.

Another large source of path length error is the air-plasma interface at the top of well 19. The plasma meniscus at the top of well 19 can expand, contract or change shape at run time depending on the volume of plasma 17 extracted by filter 2. Protrusion 50 can contact the plasma 17 at the top of well 19 such that light can travel directly from reflector 6 into plasma. Light can avoid traversing the air-plasma interface.

Narrow Band Optical Spectrum

Optical detection frequency 60 can be the peak frequency of a narrow band optical spectrum. A narrow band optical spectrum can be an optical spectrum with frequency peak and Full Width Half Maximum (FWHM) of less than 200 nm, 100 nm, 50 nm, 25 nm, 20 nm, 15 nm, 10 nm, 5 nm, 4 nm, 3 nm, 2 nm or 1 nm.

Optical Filter

Light emitted from LED 5 can have a broad spectrum with no or small peak frequency. Light can be white light. To achieve operation with a narrow band optical spectrum at a single frequency, spectrophotometer 15 can contain an optical filter 80. An optical filter 80 can have an optical passband at the optical detection frequency 60. The passband bandwidth of optical filter 80 can be less than 200 nm, 100 nm, 50 nm, 25 nm, 20 nm, 15 nm, 10 nm, 5 nm, 4 nm, 3 nm, 2 nm or 1 nm. Optical filter 80 can be placed on or near photodetector 8, IC 9, inlet of reflector 6, lens 58 of reflector 6, lens 51, protrusion 50, reflector 6, LED 5, lens 57. Optical filter 80 can be placed in the path traveled by light between LED 5 and photodetector 8. Optical filter 80 can be coated on photodetector 8, IC 9, inlet of reflector 6, lens 58 of reflector 6, lens 51, protrusion 50, reflector 6, LED 5, lens 57. Device can contain a plurality of spectrophotometers with optical filters having the same or different optical passbands.

Integrated Circuit

IC 9 can be a Complementary Metal Oxide Semiconductor (CMOS) IC. IC 9 can comprise a photodetector 8 electrically connected to a charge integrator such as a capacitor. Photodetector 8 can produce a photocurrent that is proportional to the light incident on the surface of photodetector 8. The photocurrent can charge or discharge the charge integrator. The charge integrator can be connected to an amplifier or a comparator embedded on IC 9. The IC 9 can generate a first reference voltage that can be used as a comparison trigger for the comparator. IC 9 can drive a current through LED 5. IC 9 can pre-charge the charge integrator to a second reference voltage. IC 9 can drive current through LED 5 and measure the integration time until the charge integrator voltage reaches the first reference voltage and triggers the comparator. The integration time can be the time elapsed from when the charge integrator is no longer pre-charged until the comparator is triggered and switches state. The charge integrator voltage or input of the comparator can be chopped to minimize 1/f noise. The input of the comparator can be inverted. The average integration time can be the average between the two integration times with the comparator inputs in the inverted and non-inverted states. The average integration time can correspond to the radiant flux of light from LED 5 incident on photodetector 8, and by extension corresponds to the concentration or activity of analytes 36 being measured. IC 9 can make one or more time resolved plasma absorption measurements of the absorption of plasma 17 in well 19 before, during or after reactions 35.

IC 9 can integrate a microcontroller or microprocessor to control the state of device, memory to store calibration data and results, a power management unit to drive the LEDs and sink power from the battery 40. IC9 can integrate a boost converter or a power converter to increase the supply voltage above what the batteries 40 can supply. By integrating a boost converter, the supply voltage for IC 9, LED 5 and display 41 can be boosted up and device can run off a single battery 40. Device can sink less than 20 mA, or less than 10 mA or less than 5 mA or less than 2 mA or less than 1 mA or less than 0.5 mA from battery 40.

Temperature Control

Temperature is an important factor that can alter the optical power emitted by LED 5, the sensitivity of photodetector 8 or the activity of enzymes or other reagents in reactions 35. IC 9 can integrate one or more temperature sensors to measure the temperature of IC 9, surface 11, plasma 17, LED 5 or the ambient temperature inside device. Temperature sensors can be any electronic device with deterministic temperature coefficients, such as bipolar junction transistors (BJT), diodes, bandgap or resistors. The one or more temperature sensors can be calibrated during manufacturing using a single point manufacturing temperature calibration or a multi-point temperature calibration. The temperature sensors can be soaked and calibrated at manufacturing temperature during manufacturing. The Manufacturing temperature can be equal to the run time heater temperature, such as 25 C, 30 C, 35 C, 36 C, 37 C, 38 C, 39 C or 40 C. Run time can be defined as the time when device is activated. The one or more temperature sensor calibration values and algorithms to combine them with run time temperature measurements can be stored in memory on IC 9. Temperature sensor calibration values can be combined with run time temperature measurements from temperature sensors to provide accurate temperature measurements. Calibrated run time temperature measurements can be accurate to within 2 C, 1 C, 0.5 C, 0.25 C or 0.1 C of actual temperatures. LED 5, BJTs integrated in IC 9, and resistors integrated in IC 9 can be temperature sensors. The calibration measurements from temperature sensors can be used to mathematically compensate the plasma absorption measurements for temperature changes at run time or differences between run time temperature and manufacturing temperature.

IC 9 can integrate a bandgap or other circuits to generate currents with or without temperature compensation. The current through LED5 can be temperature compensated to control the output power of LED 5. The temperature coefficient and electronic characteristics of LED 5 at manufacturing temperature can be measured and stored in the memory of IC 9. The temperature coefficient of LED 5 can be used to compensate for temperature changes at run time or differences between run time temperature and manufacturing temperature. LED 5 can be used to measure the junction temperature of LED 5 at run time using the temperature coefficient and electronic characteristics of LED 5. Electronics to measure the junction temperature of LED 5 at run time can be integrated in IC 9. The first or second reference voltage for the comparator can be compensated so the integration time of the photocurrent is constant or nearly constant with respect to changes in run temperature or difference between run time temperature and manufacturing temperature.

Reactions 35 can provide higher signal to noise ratio at higher reaction temperatures, namely physiological temperature between 30 C and 40 C, such as 30 C, 35 C, 36 C, 37 C, 38 C, 39 C or 40 C. IC 9 can integrate circuits to raise the reaction temperature of reactions 35 or maintain reaction temperature to within 2 C, 1 C, 0.5 C, 0.25 C, 0.125 C of a desired reaction temperature. IC 9 can integrate one or more heaters circuits to raise the reaction temperature of reactions 35 or maintain reactions 35 at to within 2 C, 1 C, 0.5 C, 0.25 C, 0.125 C of a desired reaction temperature. The heaters can be heater resistors integrated in IC 9. Heater resistors can be integrated into the silicon substrate of IC 9. Heater resistors integrated into the silicon substrate of IC 9 can be n-well, p-well or doped well resistors. Heater resistors can be integrated into the inter-layer dielectric (ILD) of IC 9. Heater resistors integrated into the ILD can include resistors fabricated out of poly-silicon or metal. The heater can be heated to a run time heater temperature. The run time heater temperature can be measure by a temperature sensor. The reaction temperature can be measure by a temperature sensor.

A temperature sensor can be placed in proximity to the heater. A temperature sensor can be placed to within 1 mm, 500 um, 250 um, 125 um, 100 um, 50 um, 25 um, 20 um, 10 um or 5 um of the heater for superior temperature control. The heater can be a temperature sensors. A temperature sensor can be placed in the ILD near or at the surface of the IC to measure the reaction temperature or the temperature of the plasma 17 in well 19 above the IC. The reaction temperature can the temperature of the plasma 17 in well 19. Metal pads or vias can be used to thermally couple plasma 17 in well 19 above IC 9 to a sensor embedded in IC 9.

The power through the heater can be modulated. Examples of heater modulation schemes include pulse width modulation, amplitude modulation and frequency modulation. The run time heater temperature can be different than the reaction temperature by a heat loss offset. IC can compensate for the heat loss offset by increasing the run time heater temperature. The heat loss offset can be estimated using the steady state power consumption of the heater. The heater can be a well resistor embedded in the silicon substrate of IC 9. The heater can be circular and circumscribe around the outer perimeter of photodetector 8. The heater can be constructed from a number of separate resistor in parallel and series. The heater can be powered using digital pulse width modulation techniques. The volume of plasma in well 19 can be less than 1 ul and the distance from photodiode 8 to the opposite end of well 19 can be less than 1 mm to ensure rapid and even distribution of the heat from the heater to the plasma 17.

Photodetector

All the photodetectors on IC 9 can be equidistant from one-another and arranged in a line. Deviations from this linear equidistant photodetector placement can be less than 1 mm, 0.5 mm, or 0.25 mm. The photodetectors on IC 9 can be approximately equidistant from one-another and approximately arranged in a line. The photodetectors on IC 9 can less than 3 mm, 2.5 mm, 2 mm, 1.75 mm, 1.5 mm, 1.25 mm, 1 mm, or 0.5 mm apart. Photodetector 8 can be any photoelectric device sensitive to the intensity of light. Photodetector 8 can be an active pixel sensor or charge coupled sensor. Photodetector 8 can be any photosensitive CMOS device. Photodetector 8 can be a photodiode. Photodetector 8 can be a polysilicon photodiode or a photodiode embedded in the substrate. Photodetector 8 can be n-doped or a p-doped well diode. Photodetector 8 can be implemented in an isolation well or in a stacked configuration to eliminate cross-talk from other photodetectors integrated in IC 9 or other noisy electronics integrated on IC 9. The passivation and dielectric layers above photodetector 8 can be thinned or etched to minimize attenuation of light through the ILD before reaching the embedded photodetector 8. Silicon dioxide from the ILD of IC 9 can have similar refractive index as plasma 17. Silicon dioxide from the ILD can be exposed above photodetector 8 to eliminate reflections. Standard passivation layers like polyimide and silicon nitride with different diffractive indexes to plasma 17 be etched, removed or eliminated above photodetector 8. The optical detection frequency be ultra-violet (UV), namely at 340 nm and 405 nm wavelengths. Light at 340 nm and 405 nm wavelengths may not penetrated deep into the silicon substrate. To improve the quantum efficiency of photodetector 8 for 340 nm or 405 nm wavelengths, photodetector 8 can comprise a shallow junction photodiode integrated in the silicon substrate. The depth of the junction of photodetector 8 can be less than 5 um, 4 um, 3 um, 2 um, 1 um, 0.5 um or 0.25 um. The profile of the junction can be exponentially decreasing or a buried Gaussian. An epi-layer, or a buried implant layer or a buried reverse implant layer can be embedded in the silicon substrate below the junction of the photodiode 8 to tailor the junction thickness and increase sensitivity at UV optical frequencies.

Photodetector 8 can be larger on a side than 10 um, 50 um, 100 um, 200 um, 300 um, 400 um, 500 um, or 1 mm. The area of photodetector can be larger than 100 $um^2$, 1000 $um^2$, or 1 $mm^2$. The area of photodetector 8 can be larger than or equal to the cross-sectional area of the aperture of well 19 in proximity to photodetector 8 to capture all the light that enters well 19. Multiple photodetector can be placed below each well 19. The photodetectors can be manufactured using different material or have one or more optical color filters patterned or placed on them to discriminate different frequencies of light. The surface of the IC 9 can be coated with an anti-reflective coating (ARC) to minimize the amount of light that reflects off the surface of the IC 9 before reaching the photodetector 8.

Photodetector 8 can be placed below, above or laterally to well 19 such that photodetector 8 can detect or measure the intensity of the light that traveled through well 19 along path length. Photodetector 8 can detect or measure the plasma absorption of plasma 17 in well 19 along path length. The Photodetector 8 can be integrated into IC 9. IC 9 can be embedded inside, above, on or below PCB 3. IC 9 can be mounted parallel to or flush with PCB 3.

Plasma Filter

Filter 2 can comprise one or more plasma separation membranes, one or more structures to elute filter reagents 32, one or more structures to promote mixing of plasma 17 with filter reagents 32 or one or more structures to slow or control the flow of plasma 17. Filter 2 can comprise multiple stacked, abutted, offset or laminated filters. Filter 2 can be square, circular or any other arbitrary shape. Filter 2 can be manufactured from polyethersulfone/polyvinylpyrrolidone (PES/PVP) and have graduated porosity to trap red blood cells. Filter 2 can be coated with glycine or other reagents to minimize cell leakage and lysis. The area of filter 2 can be less than 10 $mm^2$ or 30 $mm^2$ or 100 $mm^2$ or 300 $mm^2$ and can accept less than 50 ul, 25 ul, 15 uL, 10 ul, 5ul of whole blood. Filter 2 can be mounted in proximity, above, below, on or laterally to surface 11 or AOW 4. Filter 2 can accept whole blood 16 and block red blood cells from flowing to well 19. Platelets and white blood cells are interferers in spectrophotometer implementations due to light scattering. Historically, the solution to eliminating white blood cells has been to spin down the whole blood for an extended period of time and remove the buffy layer. Filter 2 can be configured to rapidly block white blood cells and platelets. Filter 2 can have a constriction layer with pore size smaller than 2.5 um, 2 um, 1.5 um, 1 um, 0.75 um, or 0.5 um.

Filter 2 can be mounted above, below, laterally or in proximity to surface 11 or AOW 4. The distance from filter 2 to surface 11 can be less than 0.5 mm, 200 um, 100 um, 50 um, 25 um, 10 um, 1 um. Filter 2 can be snap-fit, friction fit, heat staked, glued or adhered to surface 11 or AOW 4. Filter 2 can be adhered to surface 11 or AOW with double-sided tape 10. Filter 2 can contact surface 11 or AOW 4. Plasma can flow through filter 2 onto surface 11. Filter 2 can be impregnated with dried filter reagents 32 that become dissolved into plasma 17.

Plasma Flow

Filter 2 can be in proximity to and fluidically connected to spectrophotometer 15 such that plasma 17 from whole blood 16 can flow directly or indirectly from filter 2 into spectrophotometer 15. Plasma 17 from whole blood 16 can flow passively from filter 2 into spectrophotometer 15 without assistance from the user or pneumatic forces. Plasma 17 from whole blood 16 can flow from filter 2 into spectrophotometer 15 as a result of surface tension effects, such as capillary or low contact angle on surface 11. Filter 2 can be in proximity to or fluidically connected to well 19 such that plasma 17 from whole blood 16 can flow directly or indirectly from filter 2 into well 19. Plasma 17 from whole blood 16 can flow passively from filter 2 into well 19 without assistance from the user or pneumatic pressure differentials. Plasma 17 from whole blood 16 can flow from filter 2 into well 19 as a result of surface tension effects, such as capillary effects in well 19 and low contact angle on surface 11. Filter 2 can be fluidically connected to spectrophotometer 15 by surface 11. Filter 2 can be fluidically connected to well 19 of spectrophotometer 15 by capillary 22. Surface 11 can be the surface of a printed circuit board (PCB) 3 or the surface of the Array of Wells (AOW) 4 or the surface of an integrated circuit (IC) 9. Surface 11 can be co-planar with IC 9, wherein surface 11 can be the surface of photodetector 8. Light can transmit in a single direction through surface 11 before illuminating photodetector 8. The path of light can include surface 11. Surface 11 can be in the path of light traveling from LED 5 to detector 8. The surface of photodetector 8 can be incorporated in surface 11. The surface of IC 9 can be incorporated in surface 11 using a method described in Murali, P. Izyumin, I. Prabhu, S. Cohen, D. Boser, B. (2014). A MAGNETIC FLOW CYTOMETER WITH INTEGRATED MICROFLUIDICS. 159-162. 10.31438/trf.hh2014.44. The surface of the IC can be the surface of photodetector 8.

Surface 11 can be hydrophilic or coated with a hydrophilic reagent 31. Plasma 17 from whole blood 16 can flow on surface 11 into well 19 or into capillary 22. Plasma 17 can flow between surface 11 and filter 2 into well 19 or capillary 22. Plasma 17 can flow through filter 2 and through the edge 20 of filter 2 into capillary 22 and well 19. Plasma 17 on surface 11 can flow into capillary 22 of spectrophotometer 15 due to the low contact angle of plasma 17 on surface 11. Plasma on surface 11 can flow through capillary 22 and into well 19. Capillary 22 can be formed by the proximity of AOW 4 or IC 9 and surface 11. Capillary 22 can be formed between AOW 4 or IC 9 and surface 11. Plasma in surface capillary 22 can flow into well 19 by capillary action. Well 19 and capillary 22 can be fluidically connected such that plasma in capillary 22 can flow into well 19. Plasma 17 can fill well 19. Filter 2 can be fluidically connected to well 19 through surface 11 and surface capillary 22. Capillary 22 can be parallel to surface 11.

The edge 20 of filter 2 can be in proximity or in contact with AOW 4 or IC 9. Filter 2 can have a barrier 13 that can prevent red blood cells in whole blood 16 from passing through edge 20 onto surface 11 and capillary 22. Filter 2 can have a barrier 13 that can allow plasma 17 in whole blood 16 to pass through edge 20 onto surface 11 and capillary 22. The edge 20 of filter 2 can be in proximity or in contact with photodetector 15. The edge 20 of filter 2 can be in proximity or in contact with capillary 22. Filter 2 or edge 20 of filter 2 can be partially or completely inside capillary 22. Filter 2 can contain a barrier 13 and wherein barrier 13 can be inside capillary 22.

Barrier 13 can be a notch, depression, indent, hydrophobic barrier or any feature in filter 2 that can reduce or eliminate the passage of whole blood cells through or around edge 20 or around filter 2 into plasma 17. Barrier 13 can be a notch, depression, indent, hydrophobic barrier or any feature along edge 20 of filter 2. Barrier 13 can be manufactured by crushing filter 2 wherein blood cells are blocked from traveling through, over or under the crush region. The crush region can be less than 5 mm, 2 mm, 1 mm, or 0.5 mm or 0.25 mm from the edge of filter 2. Barrier 13 can be manufactured by crushing filter 2 along edge 20. The presence of whole blood cells in well 19 can interfere with the chemistry measurements. Barrier 13 can be a material blocking the movement of whole blood cells on, along or through edge 20 or filter 2. Barrier 13 can a physical dam or barrier on edge 20. Barrier 13 can slow, reduce or prevent whole blood cells from mixing with plasma 17 in gap 12, under filter 2 or in capillary 22. Barrier 13 can be on top of filter 2 and can prevent whole blood cells from passing through edge 20 or over the top of filter 2. Barrier 13 can be on filter 2 in proximity to edge 20.

Gap 12 can be the space between AOW 4 or IC 9 and filter 2. Gap 12 can be the space between AOW 4 or IC 9 and edge 20 of filter 2. Barrier 13 can reduce or eliminate blood cells from wicking through or over edge 20 into gap 12 or surface 11 or capillary 22 and ultimately into well 19. The length of gap 12 can be less than 5 mm, 2 mm, 1 mm, 0.5 mm, 0.2 mm, 0.1 mm, 0.05 mm, or 0.025 mm. The length of gap 12 can be defined as the distance between filter 2 and AOW4 or IC9. The gap 12 or barrier 13 can be used to control the or slow down the flow of plasma into well 19 and promote mixing. Surface 11 adjacent to gap 12 can be hydrophilic such that plasma under filter 2 can sheet or flow across surface 11 adjacent to gap and into capillary 22 or well 19. There may be no material such as a filter or AOW or IC directly atop surface 11 over gap 12.

The length of gap 12 can determine time necessary for plasma under filter 2 to sheet or flow across surface 11 adjacent to gap 12. Surface 11 adjacent to gap 12 can be exposed. The length of gap 12 can be long enough to ensure proper mixing of dissolved reagents in plasma 17.

Light Emitting Diode

LED 5 can be mounted on surface 11, PCB 3 or PCB 62 using epoxy, tape, an electrical socket, wirebonds, bump bond or reflowed or soldered electrical connections. LED 5 can emit light with narrow band optical spectrum centered on a peak frequency, namely the optical detection frequency 60. LED 5 can emit light with a narrow band optical spectrum with a FWHM of less than 200 nm, 100 nm, 50 nm, 25 nm, 20 nm, 15 nm, 10 nm, 5 nm, 4 nm, 3 nm, 2 nm or 1 nm. Spectrophotometer 15 can be a single frequency spectrophotometer, wherein spectrophotometer 15 can produce or measure the intensity of light at only one optical frequency, namely the optical detection frequency 60. Device can contain a plurality of single frequency spectrophotometers. Each of the plurality of single frequency spectrophotometer can produce or measure the intensity of light at a different optical detection frequency. The plurality of single frequency spectrophotometers can contain plasma from the filter 2 of different filters. The plurality of single frequency spectrophotometers can be fluidically connected to filter 2 or different filters. The plurality of single frequency spectrophotometers can be fluidically connects the surface 11 or different surfaces. Device can have multiple LEDs emitting at different optical detection frequencies. A plurality of LEDs can be mounted on the same surface 11, PCB 3 or PCB 62. A plurality of LEDs can be mounted on different flex PCBs.

LED 5 can emit light with a wide angle emission profile. LED 5 can be packaged with a lens 57 to direct or concentrate light towards for example an input lens 58 of reflector 6. LED 5 can be packaged using plastic or quartz or be a package-free bare die. LED 5 can be flipped chip bonded onto a PCB and the illumination can emit from the backside of LED 5, opposite the bonding pads. LED 5 can be chip-on-board mounted on a PCB. Plastic packages can degrade in UV light, but since device is a single-use disposable, long term degradation of the LED package is not a concern. LED 5 can be a laser diode emitting a laser or coherent light.

LED 5 can be constructed of Aluminum Gallium Nitride (AlGaN) or Gallium Nitride (GaN) or both. LED can be constructed from typical LED materials known in the art. The substrate for LED 5 can be sapphire or silicon carbide or other more typical LED substrates known in the art. LED 5 constructed from AlGaN or GaN can emit with peak frequencies at 340 nm and 405 nm. LED 5 constructed from AlGaN or GaN can be low power and can be powered by a single battery.

The LED 5 can be flip chip bonded onto a PCB 3. PCB 3 can feature registration and the flip-chip bonding process can result in LED 5 positional errors. To overcome these errors, LED 5 can be placed on PCB 3 first and IC 9, AOW 4 and reflector 6 can be placed on PCB subsequently to LED 5 and registered to LED 5. In some cases, components will be mounted on the other side of the PCB. LED 5 can be registered to a through-feature like one or more vias or one or more edges of PCB 3, and IC 9, AOW 4 and reflector 6 can be registered to the same through-features.

Spectrophotometer 15 can be encased in an optical shield 82 that blocks light from the exterior from entering well 19. Optical shield 82 can be on device in housing 44.

Array of Wells

The AOW 4 can comprise an array of 1 to 100 wells, in which the transmittance of plasma 17 with reporter molecule can be measured. One or more AOW 4 can be mounted in proximity, above, below, on or laterally to surface 11, PCB 3 or IC 9. AOW 4 can be positioned in proximity, below, above, on, laterally to, adjacent to or in contact to filter 2 or edge 20 of filter 2, or barrier 13 of filter 2. AOW 4 can contain well 19. AOW 4 can be opaque to the optical detection frequency 60 to avoid signal cross talk among the wells. A single AOW 4 can be shared among multiple spectrophotometers. Reflector 6 can be over-molded onto AOW 4. AOW 4 can be constructed from standard injection molded plastics. AOW 4 can contain a pocket for the wirebonds of IC 9. AOW 4 can contain a pocket that crushes filter 2 and creates barrier 13. Capillary 22 can be formed in between AOW 4 or IC 9 and surface 11. AOW 4 can contain capillary 22.

Well 19 can be a capillary with parallel surfaces. The parallel surface of well 19 in the configuration of a capillary can be perpendicular to light, wherein light enters through one parallel surface and exits through the parallel surface on the opposite side of the capillary. Light can pass through capillary 22, wherein AOW 4 is constructed with material transparent to light.

Well 19 can have a maximum depth of 5 mm, 3 mm, 2 mm, or 1.5 mm, or 1 mm, or 0.75 mm, or 0.6 mm, or 0.5 mm, or 0.4 mm. Well 19 can have a maximum diameter of 2 mm, 1.5 mm, 1 mm, 0.75 mm, 0.5 mm, 0.4 mm, 0.3 mm or 0.25 mm. Well 19 can be cylindrical with drafted sidewalls.

The AOW 4 can be snap-fit, friction fit, heat staked, glued or adhered to surface 11. AOW 4 can be adhered to surface 11 with double-sided tape 10. AOW 4 can be machined or injection molded. AOW 4 can be manufactured from an injection moldable plastic such as Polymethylmethacrylate (PMMA), Acrylonitrile butadiene styrene (ABS) or hydrophilic polymers. AOW 4 can be transparent, translucid or opaque. AOW 4 can have mounting points or through holes for reflector 6. Surface 11 can have mounting points or through holes for AOW 4 and reflector 6. AOW 4 can have capillary draw texture on the inside of the wells.

The inner volume of well 19 can be less than 2 uL, or 1 uL, 0.5 uL, or 0.25 uL, or 0.1 uL of plasma 17. Well 19 can be vertical or positioned at an angle vis-a-vis surface 11. Well 19 can have tapered sidewall to promote capillary action.

Tape Design

Double sided tape 10 can be mounted on surface 11. The AOW 4 can be mounted above, below, on or laterally to tape 10. Filter 2 and filter 55 can be mounted above or below, on or laterally to tape 10. Filter 2 and AOW 4 can abut or be separated by a gap 12, wherein the surface 11 adjacent or nearest to gap 12 can be exposed or uncovered.

Tape 10 can contain between 1 and 100 slots or channels that can fluidically connect one or more filters with one or more wells in one or more AOWs, such that plasma 17 from the one or more filters can flow unassisted into one or more wells. Channel 25 in tape 10 can direct the plasma 17 from filter 2, across gap 12, into capillary 22 and into well 19. Capillary 22 can be formed by surface 11, AOW 4 and channel 24. Capillary 22 can be formed by surface 11, IC 9 and channel 25. Channel 25 can fluidically connect filter 2 to well 19. Slot 25 in tape 10 can direct the plasma 17 from filter 2 into well 19.

Channels 23 and 25 can be fluidically isolated from one another on surface 11 such that plasma in one channel cannot flow into another channel or plasma in one channel cannot mix with plasma from another channel. Plasma in channels 23 and 25 can have different dissolved reagents. Channel 23 can delineate a separate reaction chamber, where a distinct chemical reaction 35 can be performed. A channel can contact a plurality of wells to a single filter.

Double-sided tape 10 can be hydrophobic or hydrophilic. Tape 10 can be hydrophobic to avoid delamination after prolonged exposure to plasma 17. Also, the use of hydrophobic tape 10 can facilitate spotting of different surface reagents spotted in different slots by eliminating unwanted mixing. Tape 10 can be thin to minimize the dead volume of plasma 17 and therefore to reduce the amount of whole blood 16 needed to run device. The thickness of Tape 10 can be less than 1 mm, 0.1 mm, 0.05 mm, 0.025 mm or 0.01 mm. Multiple slots can connect to multiple fluidically isolated filters but channel multiple plasmas to the same AOW or to same well in AOW. Multiple slots can connect to a single filter 2.

Reflector

Reflector 6 can be composed of multiple optical elements. Optical elements can be optical splitters, optical combiners, mirrors, lenses, optical diffusers, passive optical amplifiers, apertures, fully or partially reflective surfaces, total internal reflective surfaces, waveguides and other features to control or direct light. The reflector 6 can be injection molded from an injection moldable plastic transparent to light. However, for directing shorter wavelength lights like 340 nm and 405 nm light, the material from which the light-pipe or waveguide is manufactured can be transparent or translucent to ultra-violet light, such as cyclic olefin copolymers or PMMA. The refractive index of reflector 6 can be higher, lower or within 10%, 20%, 30%, 50%, 100% of the refractive index of plasma 17.

A first optical element 28 can redirect light approximately 90° from LED 5 to a second optical element 29. The second optical element 29 can redirect light approximately 90° from the first optical element 28 into plasma 17 in well 19. The first or second optical elements can also split light, focus light or change the radiation pattern of light. Reflector 6 can direct light from one diode to a plurality of wells. Reflector 6 can direct the light from a plurality of diodes into a well 19.

Reflector 6 can have a protrusion 50. Protrusion 50 can act as a waveguide. Protrusion can contact plasma 17 in well 19. Protrusion 50 can penetrate well 19 or be mounted in well 19, on the opposite side of photodetector 8. Protrusion 50 can contain a lens 51 that focuses the light from LEDs 5 or 26 onto the bottom of well 19. Protrusion 50 in reflector 6 can channel or direct the light from second optical element 29, through lens 51 and into the plasma 17 in well 19. Lens 51 can also be flat or concave. Lens 51 can be convex to avoid bubbles being trapped underneath it when well 19 fills by capillary action from the bottom up. The center of lens 51 can be the first point on reflector 6 that touches plasma 17 as well 19 fills. Photodetector 8 can be exposed to light from LED 5 that traverses from protrusion 50 or lens 51 directly into plasma 17 in well 19. Light can exit protrusion 50 through lens 51. Lens 51 can form the tip of protrusion 50. Lens 51 can focus light onto photodetector 8. Protrusion 50 and lens 51 can be mounted above well 19 or inside well 19. Protrusion 50 and lens 51 can be centered with respect to well 19. Protrusion 50 or lens 51 can contact plasma 17 at one end of well 19, opposite photodetector 8. Protrusion 50 or lens 51 can contact the sidewalls of well 19 opposite photodetector 8. A vent 52 can be formed between the protrusion 50 or lens 51 and the sidewall of well 19. Vent 52 can allow air inside well 19 to exit out of well 19 to maintain capillary action in well 19. Protrusion 50 and lens 51 can be in proximity to well 19 without contacting well 19. The minimal distance between protrusion 50 or lens 51 and the sidewall of well 19 can be less than 1 mm, 0.5 mm, 0.25 mm, 0.1 mm, 0.05 mm, 0.025 mm, 0.01 mm, 0.005 mm, or 0.001 mm. The vent 52 can be an annulus around the top rim of well 19.

Lens 51 or protrusion 50 can be above plasma 17 or well 19 and avoid contacting them. Lens 51 can focus light onto the aperture of well 19 opposite photodetector 8. The aperture of well 19 opposite the photodetector 8 can be reduced to minimize the optical interference of the meniscus of the plasma 17 on the illumination of photodetector 8. The diameter of the top aperture of well 19 can be less than 2 mm, 1.5 mm, 1 mm, 0.75 mm, 0.5 mm, 0.4 mm, 0.3 mm, 0.2 mm, or 0.1 mm. The sidewalls of well 19 can be drafter to improve capillary flow, eliminate light reflecting off the sidewalls and to reduce the diameter of the top aperture of well 19. The diameter of the aperture of well 19 opposite photodetector 8 can be smaller than the diameter of the aperture of well 19 closest to photodetector 8.

Protrusion 50 and lens 51 can be used for underfill and overfill control. The assay measurement can begin when plasma 17 contacts lens 51 or protrusion 50. The amount of light that reaches photodetector 8 can increase, decrease or change abruptly when plasma 17 contacts lens 51 or protrusion 50. The change in the amount of light on photodetector 8 when plasma 17 contacts lens 51 or protrusion 50 can be detected and used to begin the assay measurement in well 19. The assay measurements in different wells can begin at different times. The change or lack of chance in the amount of light that reaches photodetector 8 when plasma 17 contacts lens 51 or protrusion 50 can be used to indicate under-fill situations where not enough sample was applied to filter 2.

Reflector 6 can have a third optical element 53 to collect, focus or split light directly from LED 5, wherein LED 5 can be unpackaged and emit light across a wide angular pattern.

Housing

Device can also include a desiccant 43, a display 41 and one or more batteries 40 to provide power to LED 5, IC 9 and display 41. Display 41 and battery 40 can be electrically connected to IC 9. Display 41 and battery 40 can be electrically connected to PCB 3. The device can include a plastic housing 44 to encase device and all the sub-components. The housing 44 can have branding and test identifiers and a QR code printed or molded on its exterior. Device can have a button 45 or a pull tab 61 to activate device. Display 41 of device can prompt a user to apply a drop of whole blood 16 on filter 2. Display 41 can display the results of a chemistry test. Display 41 can display to the use such are over-sampling or under-sampling situations, the time remaining until the assay is complete, error codes or other information.

Device can also have a sample capillary 14 that collects whole blood 16 from a finger, pipette or syringe and wicks it to multiple filters, such as filter 2 and filter 55. Device can be configured to accept less than 15 uL of whole blood, or less than 10 uL of whole blood or less than 5 uL of whole blood. The results from the measurement from device can be displayed on display 41 or wirelessly transmitted to a nearby wireless device. Device can have a near-field communication (NFC) wireless module. In the cases where the change in amount of the optical density of the light transmitted through the plasma 17 changes quickly, device can report results as soon as they are available. Results can be reported in less than 15 minutes, or less than 10 minutes, or less than 5 minutes, or less than 3 minutes, or less than 1 minute. Digital display 41 can be a liquid crystal display (LCD), a dot matrix display, an organic LED (OLED) display, an e-ink display or other displays. Display 40 can display the concentration of one or more analytes 36. Battery 40 can power spectrophotometer 15 and display 41. Spectrophotometer 15 can comprise an integrated circuit (IC) 9. Device can have a single PCB 3. PCB 3 can be a 2-layer PCB.

Device can be integrated into a blood collection system that is fitted onto a patient and take whole blood from the patient. Device can be integrated into the blood collection system and can take whole blood from the blood collections system for analysis. The blood collection may or may not have an LCD to display the assay results. The assay results can be transmitted wirelessly to a nearby mobile device. Battery 40 can be a coin cell battery. Battery 40 can be a single coin cell battery.

Other Sensors

Device can have additional detection ICs. The additional detection ICs can be integrated on PCB 3, or on AOW4. An additional detection IC can be an electrochemical IC containing electrochemical sensors that can function either in plasma or whole blood. Platinum electrodes and permselective films can be patterned on a separate electrochemical IC to enable electrochemical sensing on device. Ion selective electrodes (ISE) can be integrated in the electrochemical IC. ISE can be used to quantify electrolytes such as sodium, potassium and chloride. An additional detection IC can be an immuno-assay IC. An immuno-assay IC can be a magnetic sensing IC 83 that performs magnetic particle labeled immuno-assays, wherein magnetic particles conjugated to antibodies can capture soluble target proteins in plasma 17. The magnetic particles can sediment via gravity to the antibody coated surface of the magnetic sensing IC to which they can bind strongly in the presence of the target proteins. Magnetic sensing IC 83 can integrate current carrying conductors adjacent to magnetic particle sensors.

The current carrying conductors can remove magnetic particles weakly bound to the surface of the magnetic sensing IC 83 from atop the magnetic particle sensors, while the magnetic particles sensors can detect magnetic particles that remain strongly bound to surface of the magnetic sensing IC above magnetic particle sensors. Magnetic particles can loaded and stored in a dry state in a well. Plasma 17 can rehydrate and release the dried magnetic particles which incubate with plasma 17, capture the target proteins and sediment to the surface of the magnetic sensing IC. The magnetic particles can be dried in a filter or in a capillary. The magnetic particles can be dried on the bottom of a filter. The magnetic particle sensors can be implemented as photodetectors 8 or as magnetic sensors embedded in the magnetic sensing IC 83. Device can contain multiple IC 9, additional detection ICs to perform chemistry tests and to perform immuno-assays. Device can contain one or more IC 9, one or more electrochemical ICs and one or more magnetic sensing ICs. Electrochemical IC and magnetic sensing IC 83 can be integrated on or parallel or flush with PCB 3. IC 9, electrochemical IC and magnetic sensing IC can have digital interfaces for communication like I²C or SPI. One IC in device can be the master IC. IC 9 can be the master IC. The master IC can contain the processor, the memory, the power management. The master IC can communicate and coordinate with all other IC in device.

Figure 1B:
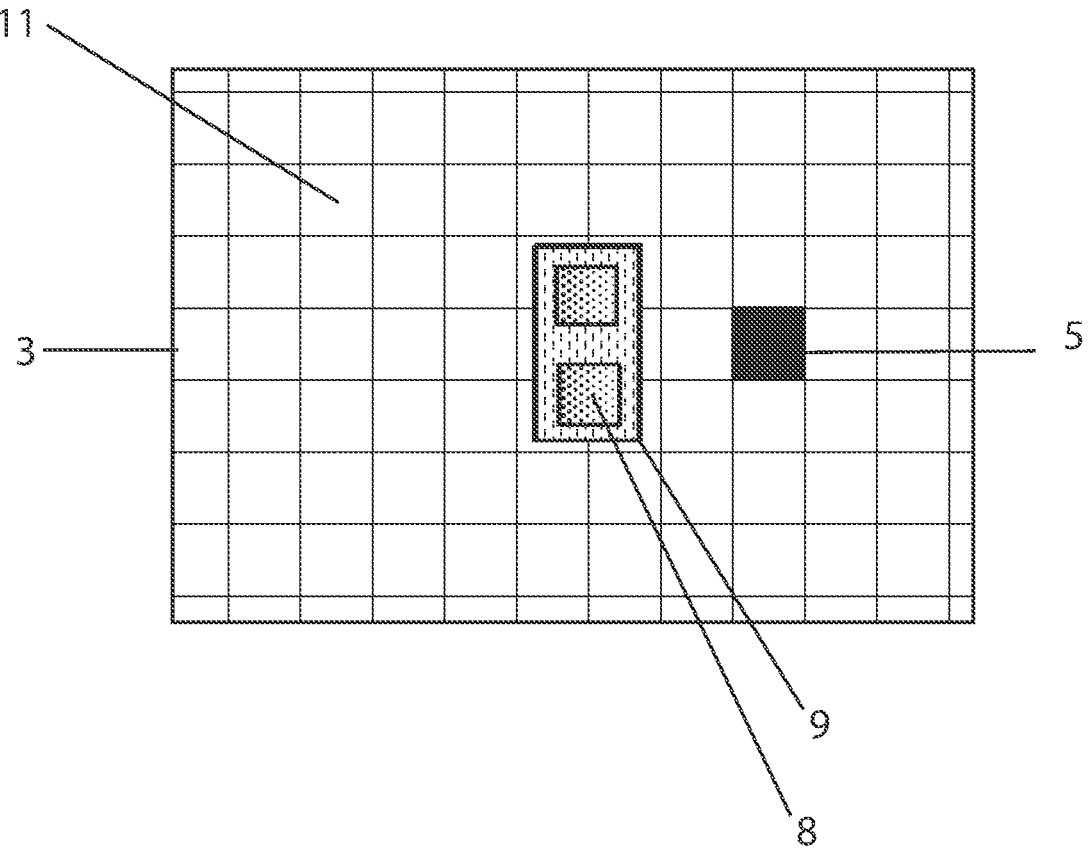
FIG. 1B is a cross sectional top view of IC 9 and LED 5 mounted on PCB 3.
Figure 1C:
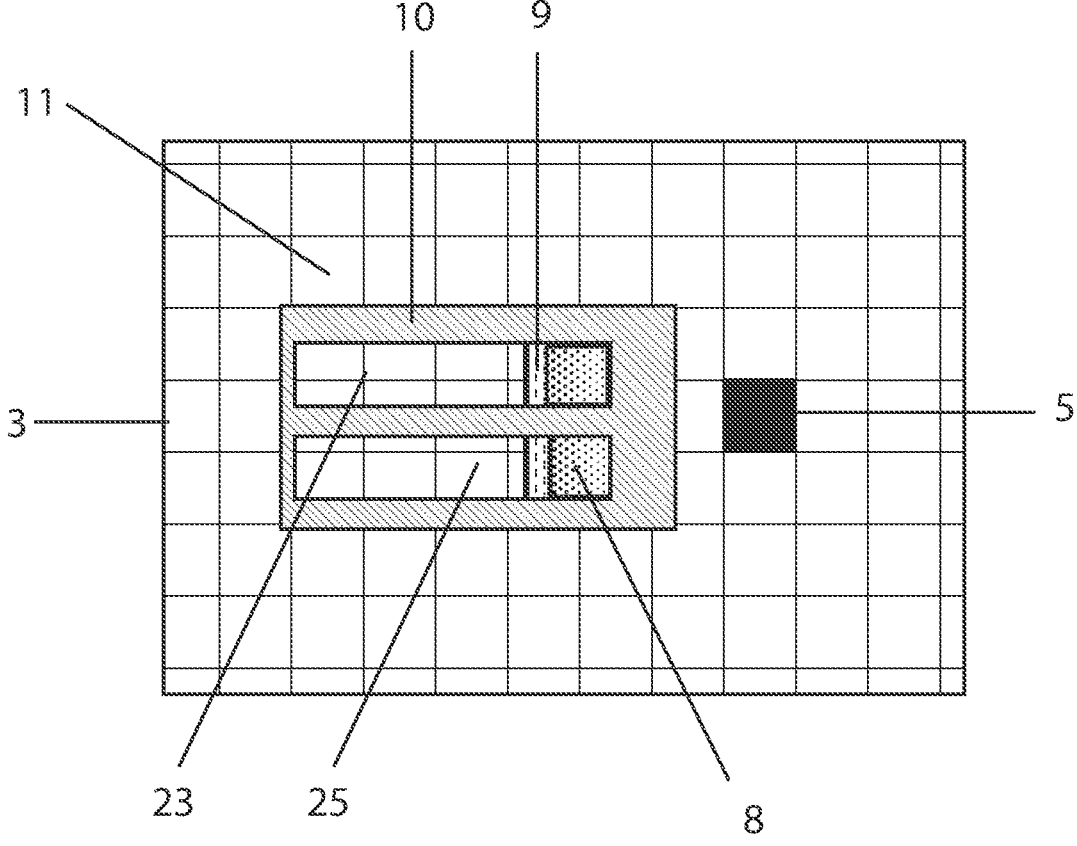
FIG. 1C presents a cross sectional top view of tape 10 with channels 23 and 25 mounted on PCB3.
Figure 1D:
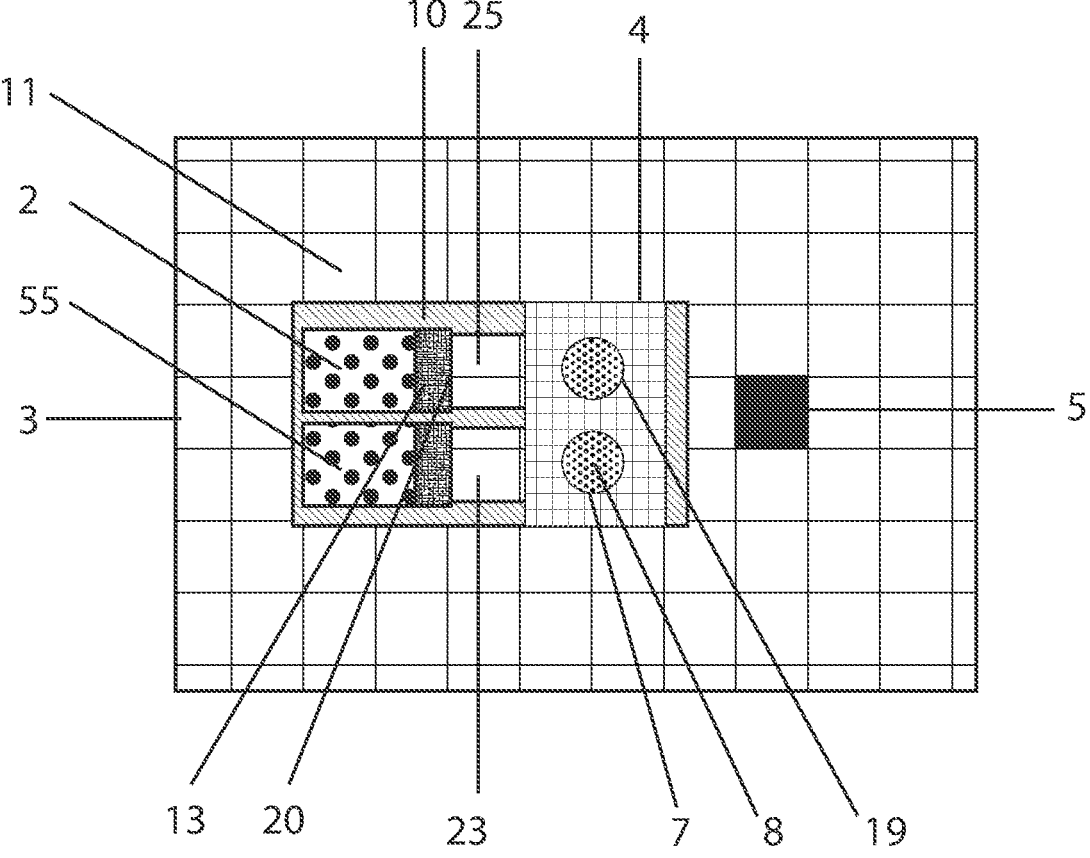
FIG. 1D shows a cross sectional top view of filter 2, filter 55 and AOW 4 mounted on tape 10.
Figure 1E:
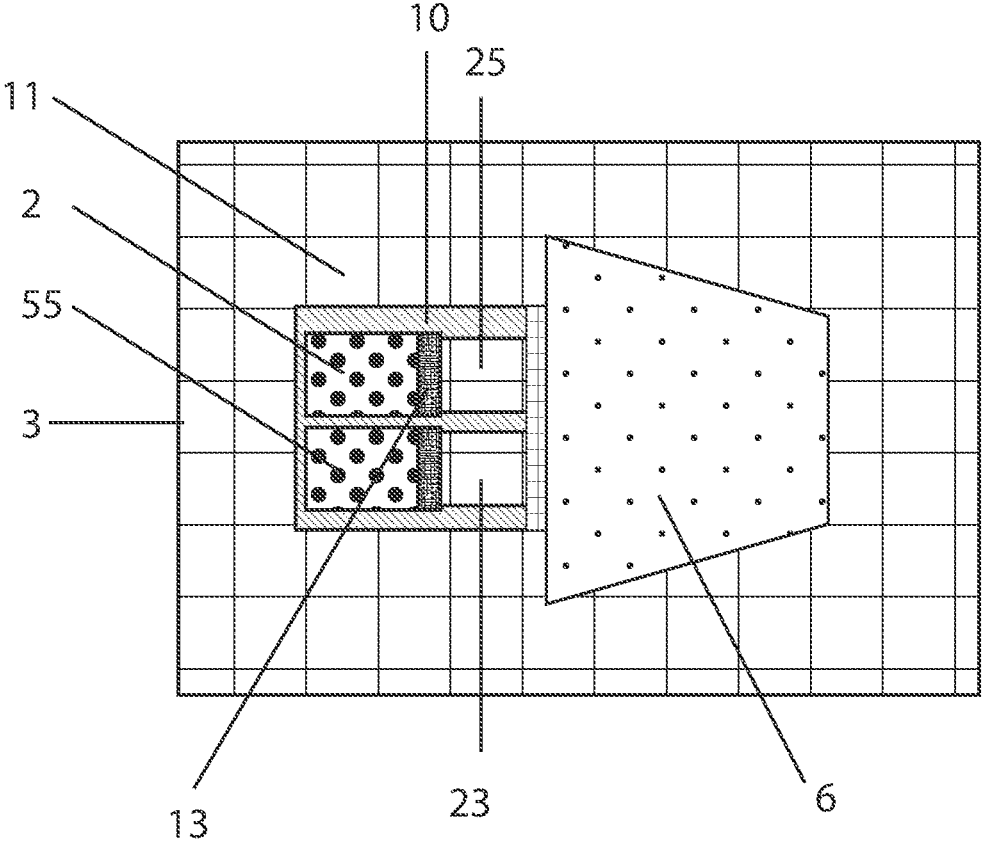
FIG. 1E is the top view of device with reflector 6.

FIG. 1A presents a cross sectional side view of device that can comprise a filter 2, a surface 11 and a spectrophotometer 15. Filter 2 can be mounted on top of surface 11 using tape 10. Surface 11 can be the surface of PCB 3. Barrier 13 can be a notch in filter 2. Plasma 17 can flow directly from surface 11 into well 19. AOW 4 can be mounted on top of surface 11 using tape 10. Surface 11 can be hydrophilic. Surface 11 can be capable of fluidically connecting filter 2 to well 19, wherein plasma 17 can flow on surface 11 across gap 12 and into capillary 22. IC 9 can integrate photodetector 8. IC 9 can be incorporated into surface 11. Protrusion 50 and lens 51 can contact plasma in well 19. Reflector 6 can contain an input lens 58 to collect light from LED 5. Reflector 6 can contain optical elements 28 and 29 to redirect light from LED 5 through well 19 and onto photodetector 8. Display 41 and a battery 40 can be electrically connected to PCB 3. PCB 3 can have a top and bottom side. Display 41 can be mounted on the top side or bottom side of PCB 3. Battery 40 can be mounted on the top side or bottom side of PCB 3. FIG. 1B is a cross sectional top view of IC 9 and LED 5 mounted on PCB 3. LED 5 can be mounted on surface 11. LED 5 can be mounted on the top side of PCB 3. IC 9 can contain 2 photodetectors, whose surfaces can be incorporated with surface 11. FIG. 1C presents a cross sectional top view of tape 10 with channels 23 and 25 mounted on PCB3. Tape 10 can be double sided tape and can be used to generate channels 23 and 25. Channels 23 and 25 can be fluidically isolated from one another. FIG. 1D shows a cross sectional top view of filter 2, filter 55 and AOW 4 mounted on tape 10. Whole blood 16 can be applied to both filter 2 and 55. Channels 23 and 25 can be capable of channeling plasma from filters 55 and 2, respectively, to wells 7 and 19, respectively. AOW 4 can contain 2 wells, 7 and 19. FIG. 1E is the top view of device with reflector 6. The battery 40 and display 41 are omitted from FIG. 1B through 1E for simplicity. In the implementation presented in FIG. 2, plasma 17 can flow up well 19 towards protrusion 50 and lens 51. Moreover, light can travel down through well 19 and through plasma 17, through surface 11 and onto photodetector 8.

Figure 2:
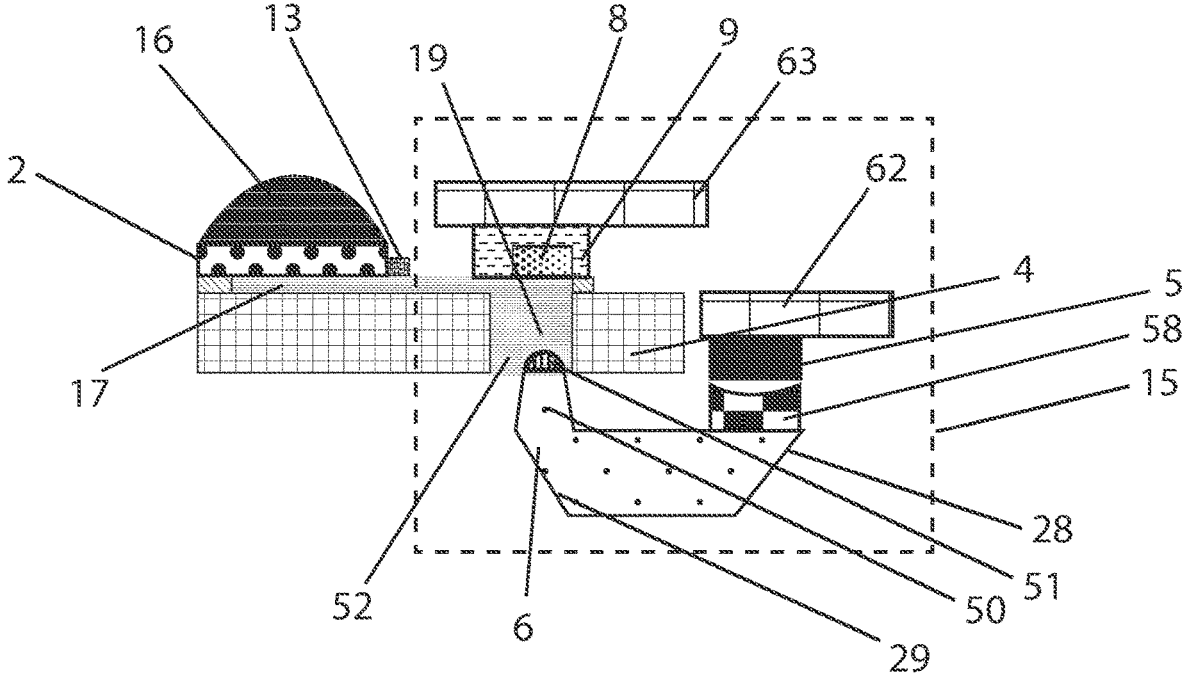
FIG. 2 presents a cross sectional side view of device with IC9 and filter 2 mounted above AOW 4.

FIG. 2 presents a cross sectional side view of device with IC9 and filter 2 mounted above AOW 4. Filter 2 can be mounted above AOW 4 using tape 10. The top surface of AOW 4 can be surface 11. Barrier 13 can be a notch in filter 2. Plasma 17 can flow directly from the top surface of AOW 4 into well 19. IC 9 can be mounted above AOW 4 using tape 10. The top surface of AOW 4 can be hydrophilic. The top surface of AOW 4 can be capable of fluidically connecting filter 2 to well 19, wherein plasma 17 can flow on the top surface of AOW 4 across gap 12 and into well 19. Gap 12 can be generated by the gap between filter 2 and IC9. IC 9 can integrate photodetector 8. Protrusion 50 and lens 51 can contact plasma in well 19. Reflector 6 can contain an input lens 58 to collect light from LED 5. Reflector 6 can contain optical elements 28 and 29 to redirect light from LED 5 through well 19 and onto photodetector 8. PCB 3, display 41 and battery 40 were omitted from FIG. 2 for simplicity. LED 5 can be mounted into a flexible PCB 62. IC 9 can be mounted into a flexible PCB 63. A flexible PCB can be manufactured out of a flexible material such as Kapton. A flexible PCB can be connected to a standard PCB by a hot bar reflow process, taping, adhering or wirebonding. Flexible PCBs 62 and 63 can be hot bar reflowed onto PCB 3 which can contain display 41 and battery 40. The use of flexible PCBs can allow easy alignment of the IC 9 to well 19 and of LED 5 to input lens 58, respectively. LED 5 can be mounted onto reflector 6 for superior alignment of LED 5 and reflector 6. Superior alignment of IC 9 to well 19 and of LED 5 to input lens 58, respectively, can lead to lower path length errors. In the implementation presented in FIG. 2, plasma 17 can flow down well 19 towards protrusion 50 and lens 51. Moreover, light can travel up through well 19 and through plasma 17, through the surface of photodetector 8. A vent 52 can be used to allow air in well 19 to escape as the plasma 17 enters.

Figure 3:
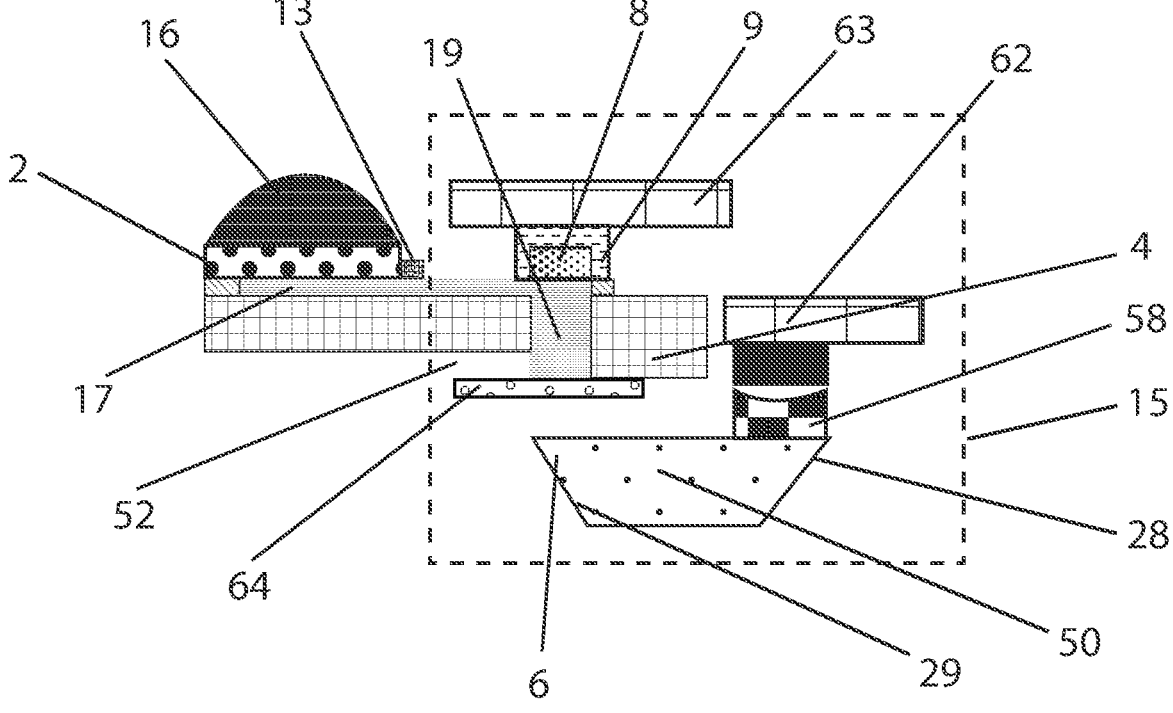
FIG. 3 is a cross sectional side view of device wherein a cover 64 is used to retain plasma 17 in well 19.

FIG. 3 is a cross sectional side view of device wherein a transparent cover 64 can be used to eliminate the meniscus effects in well 19. Plasma 17 can flow through well and create an ideal transmission interface with cover 64. Cover 64 can be transparent to the optical frequency of detector. Cover 64 can be over molded, adhered using double sided tape, glued or heat staked on AOW 4.

Figure 4A:
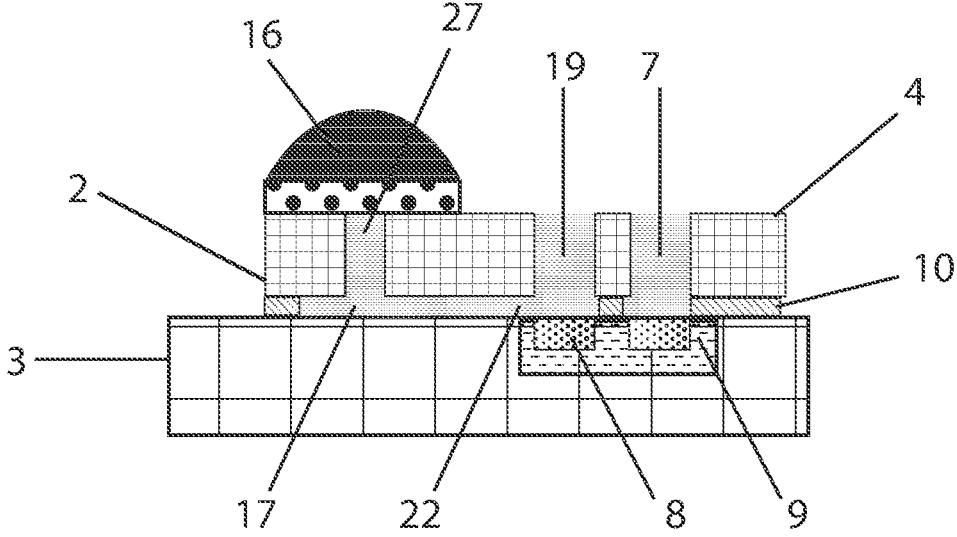
FIG. 4A shows a cross sectional side view of an implementation of device where Filter 2 is mounted on AOW 4 and AOW 4 is mounted on PCB 3.

FIG. 4A show an implementation of device wherein filter 2 can be mounted on AOW 4 and AOW 4 can be mounted on PCB 3. Filter capillary 27 can draw plasma directly from the bottom of filter 2 and can be fluidically connected with surface capillary 22, such that plasma 17 from filter 2 can flow through filter capillary 27 and into surface capillary 22.

Figure 4B:
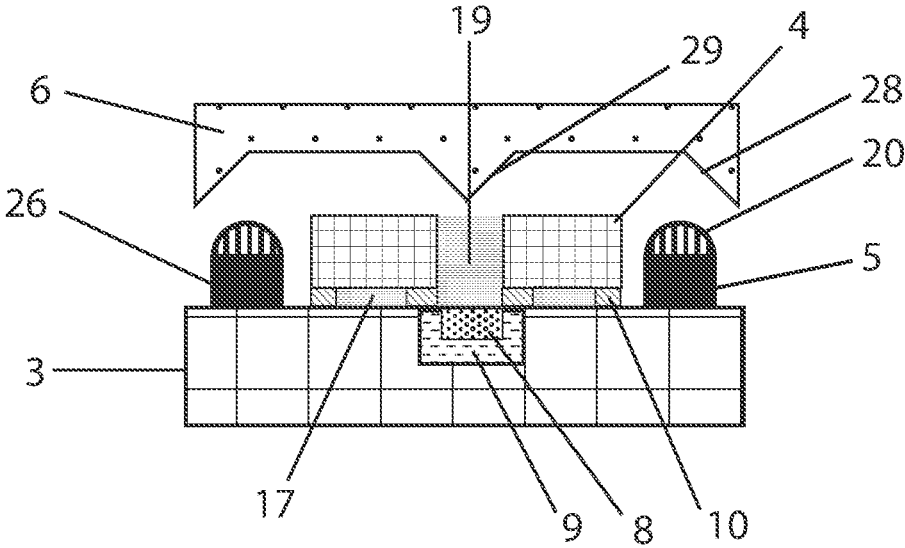
FIG. 4B presents a cross sectional side view of an implementation of device with two LEDs, LED 5 and LED 26 emitting light into the same well 19.

FIG. 4B presents a cross sectional side view of an implementation of device with two LEDs, LED 5 and LED 26 emitting light into the same well 19. LED 5 can emit light with a first optical spectrum and a second LED 26 can emit light with a second optical spectrum, different from the first optical spectrum. The first LED 5 and the second LED 26 can be activated intermittently or concurrently. A reflector 6 can direct the light from LED 5 and LED 26 into well 19.

Photodetector 8, exposed at the bottom of well 19, can detect the first optical intensity of the first optical spectrum from the first LED 5 minus the spectral absorption of the plasma 17 with reagents in well 19. Photodetector 8, exposed at the bottom of well 19, can detect the second optical intensity of the second optical spectrum from the second LED 26 minus the spectral absorption of the plasma 17 and reagents in well 19. The first optical intensity measured at different time points can be used to quantify the rate of or the amount of reagent reacted in reaction 35. The difference between the first optical intensity and the second optical intensity measured at difference time points can be used to quantify the rate of or the amount of reagents reacted in reaction 35.

The first LED 5 can produce a narrow band spectrum centered around a first frequency and the second LED 26 can produce a narrow band spectrum centered around a second frequency, different from the first frequency. Reaction 35 can alter the absorptivity of plasma 17 at the first frequency. By measuring light emitted from the first LED 5, and accounting for the time elapsed, a rate or endpoint measurement of reaction 35 can be calculated. By subtracting the measurements from light emitted from the first LED 5 and second LED 26, and accounting for the time elapsed, a rate or endpoint measurement of reaction 35 can be calculated. First LED 5 and second LED 26 can illuminate different wells.

FIG. 4B also provides an implementation of reflector 6 using external reflection or mirrors. Optical elements 28 and 29 are mirror and redirect light from LED 5 into plasma 17 of well 19.

Figure 5:
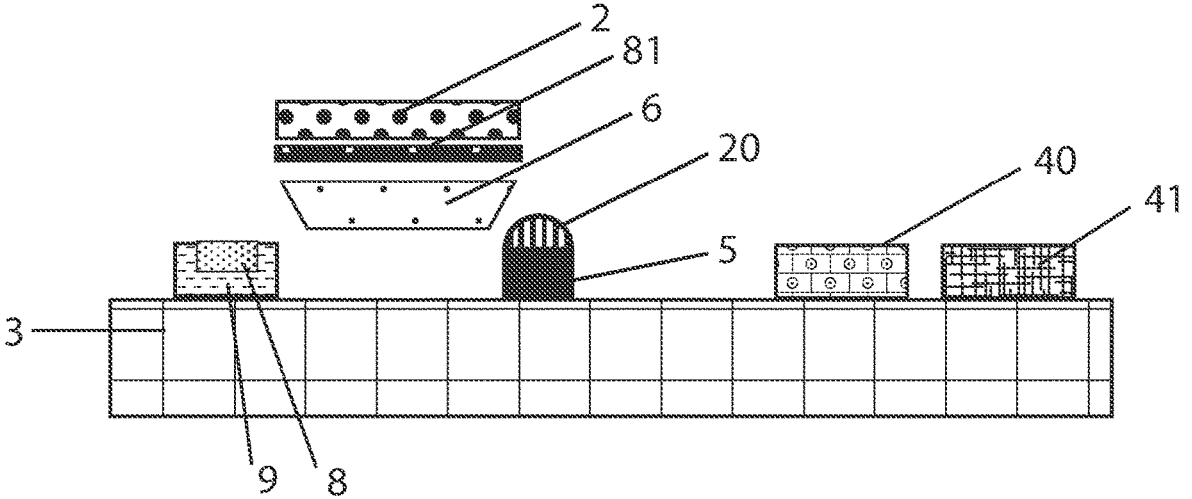
FIG. 5 show the cross-sectional side view of a reflectance spectrophotometer implementation of device.

FIG. 5 show the cross-sectional side view of a reflectance spectrophotometer implementation of device. Filter 2 can be placed in proximity or in contact to a reflectance surface 81. LED 5, IC9 and photodetector 8 can be mounted in PCB 3. PCB 3, LED 5, reflector 6 and IC 9 can be placed on opposite sides of the reflectance surface 81 with respect to filter 2. Plasma 17 from whole blood 16 can mix with filter reagents 32 in filter 2. Chemical reaction 35 can proceed in plasma 17 with dissolved reagents 33. Plasma 17 can contact reflectance surface 81. Reflector 6 can direct light from LED 5 onto plasma 17 on reflectance surface 81. Light can reflect off plasma 17 and change in spectral composition by doing so according to the concentration of reporter molecule in plasma 17. Light reflected off of plasma 17 can reflect onto photodetector 8 of IC 9. Light reflected off of plasma 17 can reflect onto reflector 6. Reflector 6 can redirect light reflected off of plasma 17 onto photodetector 6. Photodetector 8 can measure the changes in the light reflected off of plasma 17 over time at optical detection frequency 60 to determine the concentration of the reporter molecule in plasma 17. Reflector 6 can redirect light from LED 5 to multiple reflectance surfaces. Reflector 6 can redirect light reflected off of plasma 17 from a plurality of reflectance surfaces to a plurality of photodetectors. The light reflected off of plasma 17 reflected from a plurality of reflectance surface can be detected and measured by a plurality of photodetectors. Filter 2 can be contained in a well 19. Well 19 can contain plasma 17. A plurality of wells can be mounted on a plurality of reflectance surfaces. A plurality of reflectance surfaces can be combined into a carrier surface.

Figure 6:
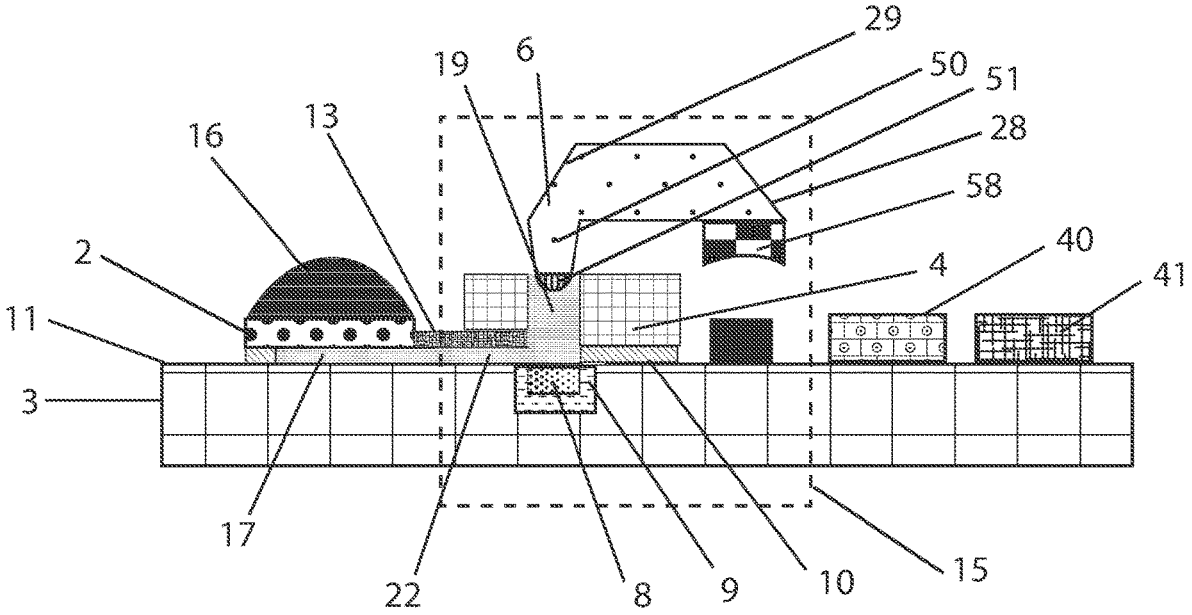
FIG. 6 is a cross sectional side view of device wherein filter 2 is in capillary 22.

FIG. 6 is a cross sectional side view of device wherein filter 2 is in capillary 22. AOW 4 can contact, crush or depress filter 2 thereby generating the barrier 13. Capillary 22 can be partially of completely full with filter 2.

The device in this disclosure may include a reflector which may be implemented using external reflective surfaces, or using total internal reflective surfaces, or using total internal reflection and redirecting light from a single LED.

The device which can comprise a membrane separation filter, mounted on a surface. The surface can be the surface of a printed circuit board (PCB) or the surface of an IC. One or more array of wells (AOW) can be mounted on the surface. The AOW can be placed in proximity or adjacent to a filter. One or more light emitting diodes (LED) can be mounted on the PCB. A reflector can redirect light produced by an LED into a well. A photodetector can be placed below the well such that the photodetector can detect or measure light traversing through the well, from the top to the bottom of the well. The photodetector can be integrated in an integrated circuits (IC). The IC can be embedded in, above or below the PCB. The IC can be mounted parallel to or flush with the surface and the PCB. The AOW can be mounted on the IC or the surface using double sided tape. The filter can be mounted on the surface using tape. The filter and AOW can be separated by a gap, wherein the surface under the gap is exposed or uncovered. The gap can also be filled with an impermeable material or a material that blocks red blood cells. The filter can have a notch along the edge adjacent to the gap to block red blood cells from flowing into the gap and into the well. A prefilter can be placed above or adjacent to the filter. The filter can contact the AOW.

The surface beneath the gap can be coated with a hydrophilic reagent, such as surface reagents. The filter can be coated or impregnated with filter reagents. The prefilter can be coated or impregnated with prefilter reagents. The well can be coated on the inside with well reagents. The bottom surface of the AOW can be coated with surface reagents or well reagents. Additional reagents can be dried in the form of a dried sphere. The dried sphere can be placed at the top of the well, at the bottom of well, below the filter, above the filter or in the gap. The dried sphere can be manufactured through lyophilization. The diameter of the dried sphere can be less than 2 mm, 1.5 mm, 1 mm, 0.75 mm, 0.5 mm, 0.4 mm, 0.3 mm, 0.2 mm, or 0.1 mm. The dried sphere can dissolve when contacted with fluid, such as the plasma.

The filter can be square, circular or any other shape. The AOW can contain between 1 and 100 wells. The tape can have between 1 and 100 slots that channel plasma from a filter to a well. Different slots can be fluidically isolated from one another on the surface of the PCB 3. Each slot can form separate reaction chambers, wherein different reactions can be performed. Separate slots can contact separate filters or they can contact a shared filter. Separate filters can contact separate prefilters, or they can contact a shared prefilter. 2 or more diodes can be placed on the same side or either side of the AOW.

A drop of whole blood from a fingerstick or venous whole blood draw can be applied on a filter or prefilter. The whole blood can mix with prefilter reagents or with filter reagents. A filter can trap the blood cells in the whole blood and let plasma pass through. Plasma can mix with filter reagents. Plasma can flow from the bottom of a filter onto a surface. Plasma can wick or sheet on a surface, across a gap, within a slot. A hydrophilic reagent can promote plasma sheeting or wicking across a gap into a surface capillary. A surface capillary can be formed between the AOW and a surface, i.e. the surface of the PCB, or between the AOW and the IC. Plasma can mix with surface reagent. A surface capillary can connect to a well such that plasma can flow from the surface capillary and into the well. The plasma can flow up the well due to capillary action and can cease to flow once it reaches the top of the well. The plasma can mix with or dissolve surface reagents, hydrophilic reagents, filter reagents, prefilter reagents, well reagents and additional reagents.

The surface reagents, hydrophilic reagents, filter reagents, prefilter reagents, well reagents and additional reagents can be dried reagents that cause a reaction involving endogenous compounds in the plasma. Reactions can change the optical characteristics of the plasma in well. For example, reactions can modify the absorption of the plasma in the well at one or more optical frequencies. A reaction can change the concentration of a reporting reagent. A reporting reagent can absorb light at one or more specific and/or narrowband optical frequencies. A reporting reagent can be included in the surface reagents, hydrophilic reagents, filter reagents, prefilter reagents, well reagents and additional reagents. Different surface reagents, hydrophilic reagents, filter reagents, prefilter reagents, well reagents and additional reagents can be applied or dissolved in different reaction chambers.

Endogenous compounds can be the rate limiting reagents in a reaction. A reaction can be a zero-order, a first order or a higher order chemical reaction. In a rate measurement, the rate of a reporter reagent consumed or produced can be measured. This rate can be proportional to a physiological concentration or one or more endogenous compounds. In an endpoint measurement, the amount of reporter reagent consumed or produced can be measured. This amount can be proportional to a physiological concentration or one or more endogenous compounds.

The device can contain a first LED emitting light with a first optical spectrum and a second LED emitting light with a second optical spectrum, different from the first optical spectrum. The first LED and the second LED can be activated intermittently or concurrently. A reflector can direct the light from the first LED and the second LED into a well. A photodetector, exposed at the bottom of the well, can detect the first optical intensity of the first optical spectrum from the first LED minus the spectral absorbance of the plasma with reagents in the well. A photodetector, exposed at the bottom of a well, can detect the second optical intensity of the second optical spectrum from the second LED minus the spectral absorbance of the plasma and reagents in the well. The first optical intensity measured at different time points can be used to quantify the rate of or the amount of reagent reacted in a reaction. The difference between the first optical intensity and the second optical intensity measured at difference time points can be used to quantify the rate of or the amount of reagents reacted in the reaction.

The first LED can produce a narrowband emission spectrum centered around a first frequency and the second LED can produce a narrowband emission spectrum centered around a second frequency, different from the first frequency. A reaction can alter the absorptivity of plasma at the first frequency. By measuring light emitted from the first LED, and accounting for the time elapsed, a rate or endpoint measurement of a reaction can be calculated. By subtracting the measurements from light emitted from the first LED and second LED, and accounting for the time elapsed, a rate or endpoint measurement of a reaction can be calculated. The first LED and the second LED can illuminate different wells.

The LED can be a surface mounted LED. The LED can be packaged with a lens to direct or concentrate the light towards the first optical element in a reflector. The LED can be packaged using plastic or quartz or be a package-free bare die. The LED can be flipped chip bonded onto a PCB and the illumination can emit from the backside of the LED, opposite the bonding pads. Plastic packages degrade in UV light, but since the device is a single-use disposable, long term degradation of the package is not a concern. The LED can be a laser diode emitting a laser or coherent light. The LED can emit light with narrowband wavelength. The center frequency of emission of the LED can be anywhere in the ultra-violet, visible and infra-red spectrum. The LED can emit light with a spectral line half width of less than 50 nm, 25 nm, 20 nm, 15 nm, 10 nm, 5 nm, 2 nm or 1 nm. The LED can emit with center frequencies at 340 nm, 405 nm, 467 nm, 550 nm, 600 nm, 850 nm or other frequency.

The reflector can be an injection molded from an injection moldable plastic. The Reflector can contain multiple optical elements. A first optical element can reflect the light from an LED to a second optical element. The second optical element can reflect the light from the first optical element into a well. The reflector can direct the light from 1, 2, 3 or 4 different diodes into a well. The reflector can comprise fully or partially reflective surfaces, total internal reflective surfaces or a waveguide. However, for directing shorter wavelength lights like 340 nm and 405 nm light, the material from which the light-pipe or waveguide is manufactured can be transparent or translucent to ultra-violet light, such as cyclic olefin copolymers. The reflector can be incorporated in a housing. The reflector can be composed of multiple optical elements, optical splitters, combiners, mirror surface, lenses, apertures and other features to control or direct light from one or more diodes.

An alternative implementation can be a device in which the filter is mounted on top of the AOW. In this case a filter capillary can traverse the AOW and can deliver plasma from the bottom of the filter into a surface capillary. In this implementation, there is no need for a notch or a gap.

The light from first LED can be redirected into a well by a first optical element and a second optical element. A protrusion in the reflector can channel or direct the light from a second optical element, through a lens and into the plasma in a well. The protrusion can contain a lens that focuses the light from the LEDs onto the bottom of a well. The lens can be flat or concave. The lens can also be convex to avoid bubbles being trapped underneath it when a well fills by capillary action from the bottom up. The reflector can have a third optical element to collect all the light from the LED. The reflector can comprise a waveguide that redirects the light from the LEDs through a protrusion and into a lens.

The protrusion and lens can be mounted above a well. The protrusion and lens can be centered with the well. The protrusion or lens can contact plasma at the top of the well. The protrusion or lens can contact the sidewalls or top of the well. A vent can be formed between the protrusion or lens and the sidewall or top of the well. The vent can allow air inside the well to exhaust out the top of the well to maintain capillary action. The protrusion and lens can be in proximity to the well without contacting the well. The width of the vent can be less than 1 mm, 0.5 mm, 0.25 mm, 0.1 mm, 0.05 mm, 0.025 mm, 0.01 mm, 0.005 mm, or 0.001 mm. The vent can be an annulus around the top rim of the well.

The assay measurement can begin when the plasma contacts the lens or protrusion. The amount of light that reaches the photodetector at the bottom of the well can increase, decrease or change arbitrarily when plasma contacts the lens or protrusion. The change in the amount of light that reaches the photodetector when plasma contacts the lens or the protrusion can be measured and used to begin the assay measurement in the well. The assay measurements in different wells can begin at different times. The change or lack thereof in the amount of light that reaches the photodetector when plasma contacts the lens or the protrusion can be used to indicate under-fill situations where not enough sample was applied to the filter.

The lens or the protrusion can be above the plasma and avoid contacting it. The lens can focus light onto the top of the well. The top aperture of the well can be minimized to reduce the optical influence of the meniscus of the plasma on the illumination of the photodetector. The diameter of the top aperture of the well can be less than 2 mm, 1.5 mm, 1 mm, 0.75 mm, 0.5 mm, 0.4 mm, 0.3 mm, 0.2 mm, or 0.1 mm. The sidewalls of the well can be tapered to improve capillary flow, eliminate light reflecting off the sidewalls and to reduce the diameter of the top aperture of the well. The diameter of the top aperture of the well can be smaller than the diameter of the bottom aperture of the well.

The device can be implemented with only one LED. The reflector can be implemented using total internal reflection and can contain one or more protrusions and lenses. The reflector can direct the light from the LED into multiple wells for analysis.

The device can contain a blank filter which can produce plasma without a reporter reagent. The device can contain a blank well which can accumulate plasma produced by a blank filter, to measure the absorbance of plasma without a reporter reagent, or blank measurement. The blank measurement can be used to determine the concentration of a reporter reagent dissolved in plasma, or the intrinsic absorbance of plasma or both. The blank measurement can be subtracted from the absorbance measurements in other wells. The blank measurement and NADH-blank measurement can be combined to measure endpoint reactions by providing the concentration of the reporter reagent before and after a reaction may occur.

The device can be configured to perform two or more multiplexed chemistry assays with a control. A chemistry test that can have medical relevance is alanine aminotransferase (ALT) and aspartate aminotransferase (AST). The device can be configured so that ALT and AST measurements are performed separately and concurrently in two wells.

A reaction for measuring ALT can comprise 1) ALT in plasma catalyzing the transfer of an amino group from L-alanine to alpha-ketoglutarate to form L-glutamate and pyruvate, and 2) lactate dehydrogenase (LDH) catalyzing the conversion of pyruvate to lactate and the oxidation of Nicotinamide adenine dinucleotide (NADH) to NAD+. A reaction for measuring AST can comprise 1) AST catalyzing the conversion of L-aspartate and alpha-ketoglutarate into oxaloacetate and L-glutamate, and 2) Malate dehydrogenase (MDH) catalyzing the conversion of oxaloacetate into malate and the oxidation of NADH to NAD+. The substrates for measuring AST and ALT can be introduced in abundance so the rate of the reactions can be limited by the rate of endogenous AST and ALT in plasma.

The reporter reagent for both ALT and AST measurements can be NADH. NADH has an absorption peak at 340 nm, so the amount or rate of NADH consumed in the reaction can be measured by illuminating the wells, with light from a first LED with an emission peak at 340 nm. In a rate measurement, the rate of change of the absorbance at 340 nm can be due to the conversion of NADH to NAD+ and can be proportional to the amount of ALT or AST present in the plasma. A photodetector can measure the change in the amount of light transmitted through plasma in the well over time, and can determine from calibration values stored on the IC the corresponding concentration of endogenous ALT. A second LED with an emission peak at 405 nm can be used to provide a constant control illumination intensity.

Filter reagents can comprise dried l-alanine, NADH, alpha-ketoglutarate, l-aspartate, MDH, LDH and excipients. The prefilter reagents can comprise dried l-alanine, l-aspartate, NADH, alpha-ketoglutarate, MDH, LDH and excipients. The surface reagents can comprise l-alanine, l-aspartate, NADH, alpha-ketoglutarate, MDH, LDH and excipients. The well reagents can comprise hydrophilic reagents to maximize the capillary force, l-alanine, l-aspartate, NADH, alpha-ketoglutarate, MDH, LDH and excipients. The additional reagents can comprise l-alanine, l-aspartate, NADH, alpha-ketoglutarate, MDH, LDH and excipients. To limit the ALT reactions to a well, LDH can be dried exclusively in a slot, or in the well. To limit the ALT reactions to a well, LDH can be exclusively included in the surface reagents, hydrophilic reagents, well reagents or additional reagents. To limit the AST reactions to a well, MDH can be dried exclusively in a slot, or in the well. To limit the AST reactions to a well, MDH can be exclusively included in the surface reagents, hydrophilic reagents, well reagents or additional reagents.

By sharing a filter, the slots can channel plasma into the wells with the same or similar reporter reagent concentration, or NADH concentration.

Each slot can be in contact with a separate filter to decouple the reactions in wells. However, in a decoupled situation, the concentrations of the reporter reagents may vary from well to well.

The dominant source of noise in this assay can be the natural oxidation of NADH into NAD+ by endogenous reactions. The well can be used as a NADH-blank well to measure the natural oxidation of NADH, or NADH-blank measurement. The NADH-blank measurement can be subtracted from the ALT, AST measurements in the wells, respectively, or from other chemistry measurements, to eliminate the contribution of the natural oxidation of NADH or other sources of noise. MDH and LDH can be omitted from the fluid path from the drop of whole blood to the blank well, such that the intended reaction cannot run in the well and only the natural oxidation of NADH is measured in the blank well. The NADH can be included in filter reagents and prefilter reagents wherein the filter and prefilter are shared between the measurement all measurement wells.

The design can be configured to measure the plasma concentrations of albumin, blood urea nitrogen (BUN), calcium, carbon dioxide (bicarbonate), chloride, creatinine, glucose, potassium, sodium, total bilirubin, total protein, alanine, aminotransferase (ALT), alkaline phosphatase (ALP) and aspartate aminotransferase (AST). The center frequency of the narrowband emission of the LEDs can be selected according to the color shift or spectral absorptivity that yields the highest signal to noise ratio.

The device can also include a desiccant, a liquid crystal display (LCD) and one or more batteries to provide power, an IC and an LCD. The device can include a plastic housing to encase the device and all the components. The housing can have branding and test identifiers and a QR code printed or molded on its exterior. The device can have a button or a pull tab to activate. The device can also have a sample capillary that collects whole blood from a finger and wicks it to the filter or prefilter. The device can be configured to accept less than 15 uL of whole blood, or less than 10 uL of whole blood or less than 5 uL of whole blood. The results from the measurement from the device can be displayed on the LCD or wirelessly transmitted to a nearby wireless device. In the cases where the change in amount of the spectral density of the light transmitted through the plasma changes quickly, the device can report results as soon as they are available. Results can be reported in less than 15 minutes, or less than 10 minutes, or less than 5 minutes, or less than 3 minutes, or less than 1 minute.

The filter can be manufactured from polyethersulfone/polyvinylpyrrolidone (PES/PVP) and have graduated porosity. The filter can be coated with glycine to minimize cell leakage and lysis. The area of the filter can be less than 10 $mm^2$ or 30 $mm^2$, or 100 $mm^2$ in order to accept less than 15 uL of whole blood.

The AOW can be machined or injection molded. The AOW can be manufactured from an injection moldable plastic such as Polymethylmethacrylate (PMMA), Acrylonitrile butadiene styrene (ABS) or hydrophilic polymers. The AOW can be transparent, translucid or opaque. The AOW can have mounting points or through holes for a reflector. The PCB can have mounting points or through holes for the AOW and the reflector.

The inner volume of the well can be less than 2 uL, or 1 uL, 0.5 uL, or 0.25 uL, or 0.1 uL of plasma. The diameter of the well can be less than 1 mm, or 0.5 mm, or 0.25 mm. The height of the well can be less than 2 mm, or 1 mm, or 0.5 mm or 0.25 mm. The well can be vertical or positioned at an angle vis-a-vis the surface. The well can have tapered sidewall to promote capillary action. The angle of the tapered sidewall with respect to a vertical can be more than 1 degree, more than 2 degrees, more than 3 degrees, more than 4 degrees, more than 5 degree, more than 6 degrees, more than 7 degrees, more than 8 degrees, more than 9 degrees, or more than 10 degrees. The angle of the tapered sidewalls of the well can be larger or equal to the highest angle off vertical of the light incident in the well to avoid from reflecting off the sidewalls of the well.

The photodetector can be a Complementary Metal Oxide Semiconductor (CMOS) photodiode. The photodetector can be an active pixel sensor. The photodetector can be connected to a charge integrator such as a capacitor, embedded on the IC. The charge integrator can be connected to an amplifier or a comparator, embedded on the IC. The IC can generate a first reference voltage for the comparator. The IC can drive a reference current through the LED. The IC can discharge the charge integrator or pre-charge the charge integrator to a second reference voltage, drive the reference current through the LED and measure the time until the charge integrator voltage reaches the first reference voltage and triggers the comparator. The charge integrator voltage or the input of the comparator can be chopped to minimize 1/f noise. The time until the charge integrator voltage reaches the first reference voltage and triggers the comparator can correspond to the amount of light incident on the photodetector, and by extension corresponds to the concentration or activity of an endogenous compound being measured. The IC can integrate a microcontroller to control the state of the device, memory to store calibration data and results, a power management unit to drive the LEDs and source power from the battery. The device can have a boost converter to increase the power supply voltage above what the batteries can provide. The IC can integrate a bandgap to generate reference currents and compensate the measurement for temperature differences. The IC can incorporate a heater and a temperature surface temperature sensor to heat the wells to a predetermined temperature during the reaction.

The area of the photodetector can be larger than or equal to the aperture at the bottom of the well. The area of the photodetector can be smaller than the aperture at the bottom of the well to ensure that light incident on the edges of the photodetector does not travel a path length this is difference from the path length traveled by light incidence on the center of the photodetector by more than 20%, 15%, 10%, 5%, 4%, 3%, 2%, 1% or 0.5%. Multiple photodetector can be placed below each well. The photodetectors can be manufactured using different material or have optical filters patterned on them to discriminate different colors of light. The passivation and dielectric layers above the photodetector can be thinned or etched to minimize attenuation of light before reaching the embedded photodetector. The surface of the IC can be coated with an anti-reflective coating (ARC) to minimize the amount of light that reflects off the surface of the IC before reaching the photodetector.

Double-sided tape can be hydrophobic or hydrophilic. The tape can be hydrophobic to avoid delamination after prolonged exposure to plasma. Also, the use of hydrophobic tape can facilitate spotting of different surface reagents spotted in different slots by eliminating unwanted mixing. The tape can be thin to minimize the dead volume of plasma and therefore to reduce the amount of whole blood needed to run the device. The thickness of the tape can be less than 1 mm, 0.1 mm, 0.05 mm, 0.025 mm or 0.01 mm. Multiple slots can connect to multiple fluidically isolated filters but channel multiple plasmas to the same AOW or to same well in AOW. Multiple slots can connect to a single filter.

A gap between AOW and the filter can eliminate red blood cells from wicking into plasma via the capillary effects at the interface between the filter and the AOW. The length of the gap can be less than 5 mm, 2 mm, 1 mm, 0.5 mm, 0.2 mm, 0.1 mm, 0.05 mm, or 0.025 mm. The gap can be eliminated provided there is a notch or barrier for whole blood cells on the edge of the filter.

A notch can reduce or eliminate the flow of whole blood cells from the top of the filter into plasma in the gap via the edge of the filter. The presence of red blood cells in the well can interfere with the chemistry measurements. The notch can be a depression, an indent, or any feature in the filter that reduces or eliminate the lateral flow of red blood cells through the edge of the filter or over the top of the filter. The notch can be manufactured by crushing the filter wherein blood cells are blocked from traveling laterally through the crush region. The crush region can be less than 5 mm, 2 mm, 1 mm, or 0.5 mm or 0.25 mm from the edge of the filter. The notch can be substituted by a hydrophobic dam or barrier on the edge of the filter or a physical dam or barrier on the edge of the filter that prevents red blood cells from reaching plasma in the gap via the edge of the filter.

The output power of the LED can vary according to lot number and other factors. Small tolerance changes in the position of the reflector can affect the amount of light it directs into the wells. The sensitivity of the photodetector can vary according to a variety of factors. For endpoint measurements, it can be necessary to calibrate the optical system, or to calibrate the amount of light incident on the photodetector and the signal that it corresponds. The system can be calibrated in air, where the wells are filled with air. In this case, the optical power transmitted out of the LED, through the reflector and into the photodetector with air in the well can be the same as the optical power transmitted out of the LED, through the reflector and into the photodetector with fluid in the well. Due to changes in refractive indices, the optical power transmitted out of the LED, through the reflector and into the photodetector with air in the well can be a deterministic function of the optical power transmitted out of the LED, through the reflector and into the photodetector with fluid in the well. Alternatively, the optical power transmitted out of the LED, through the reflector and into the photodetector can be measured using a calibration fluid in the well, such as a coating reagent. Alternatively, the sensitivity of the photodetector can be calibrated, and the optical power transmitted out of the LED, through the reflector and into the photodetector can be measured during the assay.

Temperature is an important factor that can alter the optical power emitted by the LED or the sensitivity of the photodetector or the activity of enzymes. The current through the LED can be temperature compensated so the output power of the LED is constant or nearly constant with respect to temperature. The reference voltage for the comparator can be compensated so the integration time of the photocurrent is constant or nearly constant with respect to temperature. The IC can have a memory block that stores temperature calibration data to calibrate the assay measurements for changes in temperature. A heater integrated in the IC or on the PCB to maintain the well at a constant and predictable temperature.

The LED can be flip chip bonded onto the PCB. PCB feature registration and the flip-chip bonding process can result in LED positional errors. To overcome these errors, the LED can be placed on the PCB first and the IC, AOW and reflector can be placed on PCB subsequently to the LED and registered to the LED. In some cases, components will be mounted on the other side of the PCB. The LED can be registered to a through-feature like one or more vias or one or more edges of the PCB, and IC, AOW and reflector can be registered to the same through-features.

The device can contain electrochemical sensors that function either in plasma or whole blood. Platinum electrodes and permselective films can be patterned on separate electrochemical IC to enable electrochemical sensing on the device. Ion selective electrodes can be integrated in the electrochemical IC. The device can contain a magnetic sensing IC that performs magnetic particle labeled immunoassays, wherein magnetic particles conjugated to antibodies can capture soluble target proteins in plasma. The magnetic particles can sediment via gravity to the antibody coated surface of the magnetic sensing IC to which they can bind strongly in the presence of the target proteins. Magnetic sensing IC can integrate current carrying conductors adjacent to magnetic particle sensors. The current carrying conductors can remove magnetic particles weakly bound to the surface of the magnetic sensing IC from atop the magnetic particle sensors, while the magnetic particles sensors can detect magnetic particles that remain strongly bound to surface of the magnetic sensing IC above magnetic particle sensors. Magnetic particles can be loaded and stored in a dry state in a well. Plasma can rehydrate and release the dried magnetic particles which incubate with plasma, capture the target proteins and sediment to the surface of the magnetic sensing IC. The magnetic particle sensors can be implemented as photodetectors embedded in the magnetic sensing IC. The device can contain one IC to perform chemistry tests and another IC to perform immuno-assays. The device can contain one or more ICs, one or more electrochemical ICs and one or more magnetic sensing ICs. Electrochemical IC and magnetic sensing IC can be integrated on or parallel or flush with the PCB. The IC, electrochemical IC and magnetic sensing IC can have digital interfaces for communication like I²C or SPI.

The device can be integrated into a blood collection system that is fitted onto a patient and take whole blood from the patient. The device can be integrated into the blood collection system and can take whole blood from the blood collections system for analysis. The blood collection may or may not have an LCD to display the assay results. The assay results can be transmitted wirelessly to a nearby mobile device.

I claim:

1. A device for measuring the concentration or activity of one or more analytes comprising:
   a plasma comprising the analyte;
   a spectrophotometer;
   a filter mounted on a surface, wherein the filter comprises a plasma separation membrane;
   the surface fluidically connecting the filter with the spectrophotometer, wherein the device is configured so the plasma can flow directly from the filter onto the surface and into the spectrophotometer;
   wherein the spectrophotometer comprises a plurality of wells, and wherein the device is configured so the plasma flows from the surface into the wells, and wherein the wells are configured to contain the plasma,
   a reporter molecule dissolved in the plasma, wherein the reporter molecule is a product or reactant to a chemical reaction, and wherein the chemical reaction is homogeneous and label-free, and wherein the chemical reaction is limited by a concentration or an activity of the analyte in the plasma in the well; and
   wherein the spectrophotometer is configured to measure a rate of change or absolute change of the concentration of the reporter molecule in the plasma in the well, corresponding to the concentration or the activity of the analyte in the plasma in the well.

2. The device of claim 1, wherein the spectrophotometer comprises a light emitting diode (LED) configured to emit a light with a peak frequency at an optical detection frequency and with a narrow band optical spectrum, wherein the LED is configured so the light traverses through the plasma, and wherein the reporter molecule absorbs part or all of the light traversing through the plasma.

3. The device of claim 2, wherein the spectrophotometer comprises a photodetector, wherein the device is configured so the light is incident on the photodetector and wherein the photodetector is configured to be sensitive to the light at the optical detection frequency.

4. The device of claim 3, wherein the spectrophotometer comprises a reflector configured to redirect the light at the optical detection frequency through the plasma in the well.

5. The device of claim 4, wherein the reflector comprises a protrusion, and wherein the protrusion contacts the plasma in the well.

6. The device of claim 5, wherein a nominal path length can vary from an actual path length by less than 5%.

7. The device of claim 4, wherein the spectrophotometer comprises a surface capillary, and wherein at least the edge of the filter is partially or completely inside the surface capillary.

8. The device of claim 4, wherein an array of wells (AOW) comprises the plurality of wells, and wherein a gap between the filter and the AOW is less than 2 mm.

9. The device of claim 4, wherein the spectrophotometer comprises an integrated circuit (IC), and wherein the photodetector is integrated in the IC.

10. The device of claim 9, wherein the surface is co-planar with a surface of the IC.

11. The device of claim 4, further comprising a prefilter above or adjacent to the filter, and wherein the prefilter is coated and/or impregnated with prefilter reagents.

12. The device of claim 11, wherein the analyte comprises at least one of alanine aminotransferase (ALT), aspartate aminotransferase (AST), potassium, magnesium, glucose, creatine kinase, total cholesterol or blood urea nitrogen.

13. The device of claim 4, wherein the LED is configured to emit the light at a wavelength of 340 nm, wherein the narrow band optical spectrum of the light has a Full Width Half Maximum (FWHM) of less than 20 nm, and wherein the reporter molecule comprises nicotinamide adenine dinucleotide (NADH).

14. The device of claim 4, further comprising a near-field communication (NFC) wireless module configured to wirelessly transmit measurement results from the device to a nearby wireless device.

15. The device of claim 4, further comprising a battery electrically connected to the spectrophotometer, wherein the battery is configured to supply power to the spectrophotometer.

16. The device of claim 4, further comprising an additional magnetic sensing IC configured to perform magnetic particle labeled immuno-assays.

17. The device of claim 4, wherein the LED is configured to emit the light at a wavelength of 405 nm, wherein the narrow band optical spectrum of the light has a FWHM of less than 20 nm.

18. The device of claim 17, wherein the analyte comprises at least one of alkaline phosphatase (ALP), amylase, calcium or gamma glutamyltransferase.

\* \* \* \* \*